(12) United States Patent
Fowe et al.

(10) Patent No.: US 12,174,032 B2
(45) Date of Patent: Dec. 24, 2024

(54) REAL-TIME LANE-LEVEL TRAFFIC PROCESSING SYSTEM AND METHOD

(71) Applicant: HERE Global B.V., Eindhoven (NL)

(72) Inventors: James Adeyemi Fowe, Chicago, IL (US); Bruce Bernhardt, Chicago, IL (US)

(73) Assignee: HERE Global B.V., Eindhoven (NL)

( * ) Notice: Subject to any disclaimer, the term of this patent is extended or adjusted under 35 U.S.C. 154(b) by 282 days.

(21) Appl. No.: 17/714,609

(22) Filed: Apr. 6, 2022

(65) Prior Publication Data
US 2023/0324195 A1 Oct. 12, 2023

(51) Int. Cl.
*G01C 21/34* (2006.01)
*G08G 1/01* (2006.01)
*G08G 1/052* (2006.01)

(52) U.S. Cl.
CPC ....... *G01C 21/3492* (2013.01); *G08G 1/0112* (2013.01); *G08G 1/052* (2013.01)

(58) Field of Classification Search
CPC ............ G01C 21/3492; G01C 21/3819; G08G 1/0112; G08G 1/052
See application file for complete search history.

(56) References Cited

U.S. PATENT DOCUMENTS

| | | | |
|---|---|---|---|
| 7,930,095 B2 | 4/2011 | Lee | |
| 9,964,414 B2 | 5/2018 | Slavin et al. | |
| 11,360,475 B2* | 6/2022 | Abrams | B60W 60/0011 |
| 11,721,212 B2* | 8/2023 | Chikamori | G08G 1/167 |
| | | | 701/428 |
| 11,881,103 B2* | 1/2024 | Lee | G08G 1/0133 |
| 2013/0282264 A1 | 10/2013 | Bastiaensen et al. | |
| 2014/0278052 A1* | 9/2014 | Slavin | G01C 21/3492 |
| | | | 701/400 |
| 2015/0045072 A1* | 2/2015 | Chao | G01S 19/42 |
| | | | 455/456.6 |
| 2020/0286372 A1* | 9/2020 | Fowe | G01C 21/3841 |
| 2021/0055424 A1* | 2/2021 | Fowe | G01C 21/3841 |
| 2021/0095990 A1* | 4/2021 | Fowe | G01C 21/3691 |

* cited by examiner

*Primary Examiner* — Babar Sarwar
(74) *Attorney, Agent, or Firm* — Lempia Summerfield Katz LLC

(57) ABSTRACT

System and methods for real-time lane level traffic processing. A lane level map matcher is used to map match probe data from probes to the lane level. A lane level travel time aggregator determines an optimal method to allocate travel-time per-link for a probe trajectory that traverses at least one lane. A lane aggregator aggregates the probe trajectories and probe-path speeds per-lane and obtain the representative speed for the lane.

15 Claims, 14 Drawing Sheets

REAL-TIME LANE-LEVEL TRAFFIC PROCESSING SYSTEM AND METHOD

FIELD

The following disclosure relates to navigation devices or services.

BACKGROUND

Real-time traffic management systems manage and monitor traffic behaviors in real time by utilizing a network of technologies including sensors, smart cameras, GPS, and Bluetooth/Wi-Fi. Real-time traffic management systems may be used to efficiently reduce congestion, bottlenecks and other traffic issues. Real-time traffic management systems may be used to suggest alternate routes to drivers when routes are congested and indicate to public transport operators and decision makers where user demand and supply is located.

Intelligent traffic services provide integrated optimization of road and transport networks to match infrastructure demand and supply in near real-time, managing speeds, frequencies, and prioritization of vehicles while abiding by regulations and safety requirements. Intelligent traffic services that include real-time traffic management systems improve the quality and performance of road services. Without the use of real-time data, traffic information, network improvements, integration of new transport modes, and infrastructure development lag transport needs.

Drivers and autonomous vehicles need information to avoid busy intersections and bottlenecks. Another issue is transport agencies not having the necessary information to have a holistic view of the network, in order to make short-term decisions to adapt to events and incidents. Using real-time traffic management systems, traffic data can be combined across a network to provide a comprehensive picture of the current traffic situation in an area. With the right tool, future traffic can also be predicted, allowing agencies to develop strategies simultaneously to realize the best scenario and prevent the congestion from getting worse, to create connected cities with seamlessly integrated and efficient transport networks.

With the on-going disruption of the transportation industry and rapid advancement in intelligent transportation system technologies, emerging smart cities, navigation systems, and autonomous transportation, the need for highly accurate spatial-temporal localization leveraging insight from real-time lane level traffic processing has never been more crucial.

SUMMARY

In an embodiment, a method is provided for real-time lane level traffic processing. The method includes acquiring probe data from a probe vehicle, map matching the probe data at a lane level, generating a probe path for the probe vehicle based on the map matched probe data, allocating a travel-time per link for the probe path to one or more lanes on each respective link, aggregating probe paths and probe speeds for each lane of the one or more lanes, and calculating a representative speed for each lane of the one or more lanes based on the aggregated probe trajectories and probe speeds.

In an embodiment, a system is provided for real-time lane-level traffic processing. The system includes a probe relay, a path analyzer, a lane level map matcher, a lane level travel time allocator, a lane aggregator, and a publisher. The probe relay is configured to receive probe data from a probe vehicle. The path analyzer is configured to generate probe paths from the probe data. The lane level map matcher is configured to map match each of the probe data to a lane. The lane level travel time allocator is configured to allocate lane level travel time to every lane in the probe path. The lane aggregator is configured to collect all the lane level travel times on a specific lane and produce a traffic record for the specific lane. The publisher is configured to publish the traffic record.

In an embodiment, an apparatus is provided that includes at least one processor; and at least one memory including computer program code for one or more programs; the at least one memory configured to store the computer program code configured to, with the at least one processor, cause the at least one processor to: acquire probe data from a probe vehicle; map match the probe data at a lane level; generate a probe path for the probe vehicle based on the map matched probe data; allocate a travel-time per link for the probe path to one or more lanes on each respective link; aggregate probe paths and probe speeds for each lane of the one or more lanes; and calculate, at regular intervals, a representative speed for each lane of the one or more lanes based on the aggregated probe trajectories and probe speeds.

BRIEF DESCRIPTION OF THE DRAWINGS

Exemplary embodiments of the present invention are described herein with reference to the following drawings.

DETAILED DESCRIPTION

Figure 1:
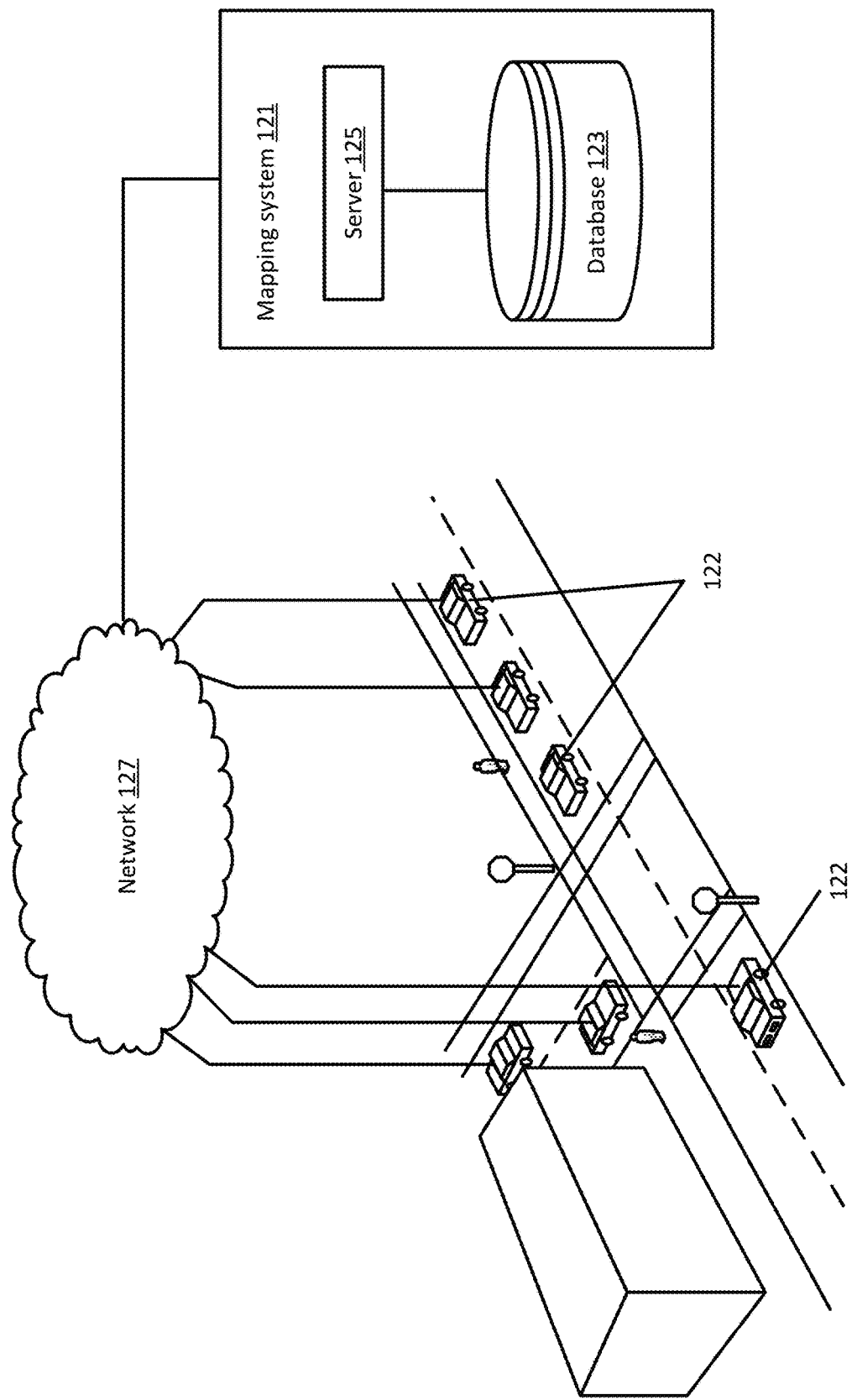
FIG. 1 depicts an example system for real-time lane-level traffic processing according to an embodiment.

Embodiments described herein relate to real-time lane level traffic processing. A lane level map matcher is used to map match probe data from probes to the lane level. A lane level travel time aggregator determines an optimal method to allocate travel-time per-link for a probe trajectory that traverses at least one lane. A lane aggregator aggregates the probe trajectories and probe-path speeds per-lane and obtain the representative speed for the lane.

Existing map matching algorithms can successfully map GPS coordinates to a certain road segment in order to give information about the surroundings of a vehicle. However, specific features of the road such as the current lane of the car are difficult to obtain via map matching, mostly due to the noisy nature of GPS signals. Typically, the location of a vehicle is provided through a global positioning system either by itself or in combination with an inertial navigation system or dead reckoning. These sensors are not perfect, however, and using them introduces an error in the location data. More complicated and accurate map matching techniques use additional information such as heading, trajectories, image data, etc. However, the additional information requires additional processing and may take additional time. As such, lane level map matching in real-time is challenging.

Embodiments provide real-time lane level map matching using lane probabilities of probes based on their lateral position within a road segment as described herein. Identifying a lane for a probe vehicle, however, is not the end point for traffic management or monitoring systems. The lane level position must be aggregated and analyzed further in order to provide real-time lane level traffic processing that is useful for navigation systems and services. One existing problem is the inability of current navigation systems and intelligent traffic systems to aggregate probe-path speeds on a lane-by-lane basis. Current systems may use probe-path generators to perform link-level routing and generate a number of sequential links between two map-matched probe pairs. These are then used in generating path speeds on links which may be used in traffic reporting and other navigation applications. The challenge is how to extend the map-match paths at the road level to map-matched path at the lane level, including understanding the transitions between lanes. Such an effort is more complex than only performing this task at the road level requiring more resources and understanding of the incoming data quality to validate the accuracy of the solution. Embodiments solve this problem by putting not just spot (single-point) probes on a lane, but also probe-paths on lane(s), a necessary component to achieve lane-level traffic technology.

The following embodiments relate to several technological fields including but not limited to navigation, traffic applications, and other location-based systems. The following embodiments achieve advantages in each of these technologies because an increase in the accuracy in real time improves the effectiveness, efficiency, and speed of specific application in these technologies. In each of the technologies of navigation, traffic applications, and other location-based systems, improved identification of roadway incidents enhances the technical performance of the application. In addition, users of navigation, traffic applications, and other location-based systems are more willing to adopt these systems given the technological advances in roadway incident identification, tracking, and monitoring.

FIG. 1 depicts a system for real-time lane-level traffic processing. The system includes at least one or more devices 122, a network 127, and a mapping system 121. The mapping system 121 may include a database 123 (also referred to as a geographic database 123 or map database) and a server 125. Additional, different, or fewer components may be included. In an embodiment, the one or more devices 122 acquire probe data. The server 125 map matches the probe data to the lane level using data from, for example, the geographic database 123. The server 125 generates probe paths. The server 125 allocates travel time to respective lanes. The server 125 aggregates the travel times to provide real time lane level traffic reporting.

The one or more devices 122 may include probe devices 122, probe sensors, IoT (internet of things) devices 122, or other devices 122 such as personal navigation devices 122 or connected vehicles. The device 122 may be a mobile device or a tracking device that provides samples of data for the location of a person or vehicle. The devices 122 may include mobile phones running specialized applications that collect location data as the devices 122 are carried by persons or things traveling a roadway system. The one or more devices 122 may include traditionally dumb or non-networked physical devices and everyday objects that have been embedded with one or more sensors or data collection applications and are configured to communicate over a network 127 such as the internet. The devices 122 may be configured as data sources that are configured to acquire sensor data and/or roadway feature data. These devices 122 may be remotely monitored and controlled. The devices 122 may be part of an environment in which each device 122 communicates with other related devices in the environment to automate tasks. The devices 122 may communicate sensor data to users, businesses, and, for example, the mapping system 121.

The devices 122 may also be configured to provide probe reports to the mapping system 121 while traversing a roadway network. This probe data may be referred to as historical probe data if collected in older epochs or may be referred to as real-time if collected and provided in real time (e.g., a current epoch). An epoch may be a time period used to group probe reports or traffic reports into a manageable period. The time period may relate to a time of day, day of week, or day of the year. The epoch may be related to or take into account holidays or business hours. The time epoch may have various duration such as 5 seconds, 10 seconds, 30 seconds, 1 minute, 15 minutes, 1 hour, or another value. For real-time collection, for example, a device 122 may collect and transmit a probe report every 2 seconds, 5 seconds, 10 seconds etc.

The probe data includes latitude and longitude of the probe device as it traversed a geographical region. Each vehicle and/or mobile device 122 may include position circuitry such as one or more processors or circuits for generating probe data. The probe data may include location data generated by receiving Global Navigation Satellite System (GNSS) signals and comparing the GNSS signals to a clock to determine the absolute or relative position of the vehicle and/or mobile device 122. The location data may be generated using embedded sensors or other data relating to the environment of a vehicle or device 122. The location data may include a geographic location such as a longitude value and a latitude value and an accurate time stamp. In addition, the probe data may include a height or altitude.

The location/position of the vehicle and/or mobile device 122 may be determined at the lane level. A lane of the roadway is a section of the roadway designed for a single line of vehicles. The lanes of a roadway are arranged in a direction perpendicular to the direction of travel on the roadway. The lanes of the roadway may be divided by one or more lines. The probe data may be filtered into different lanes using one or more of a variety of techniques. Lane level map matching involves matching locational data to a lane. Different lane level map matching techniques may be used. In an example, the probe data is collected at a high enough spatial resolution by positional circuitry (for example GPS) to distinguish between lanes of the roadway. The device 122 or mapping system 121 may identify the locations of the lanes through clustering positions of vehicles as they traverse the roadway. The number of clusters corresponds to the number of lanes, and the default lane size is centered around the lane clusters. In an embodiment, the latitude and longitude of probe data of each vehicle is compared to previously calculated lane probabilities to determine a lane position (for example using trajectories). Lane level map matching may also use stored lane positions such as the boundaries for the lanes from memory or the geographic database 123.

In another example, the lanes may be distinguished, and the probe data map matched through another type of positioning. For example, the mapping system 121 may analyze image data from a camera or distance data from a distancing system such as light detection and ranging (LiDAR). The mapping system 121 may access a fingerprint or other template to compare with the image data or the distance data. Based on the comparison, the mapping system 121 determines the lane of travel of the mobile device 122. In another example, the device 122 detects lane lines. The lane lines may be detected from the camera data or distance data. Images of the road surface may be analyzed by the device 122 to identify patterns corresponding to lane lines that mark the edges of the lanes. Similarly, distance data such as LiDAR may include the location of lane markers.

In another example, the mapping system 121 or device 122 performs triangulation to determine the lane of travel of the mobile device 122. Triangulation may involve comparison of the angle, signal strength, or other characteristics of wireless radio signals received from one or more other devices. The positioning may be based on a received signal strength indicator (RSSI) measured at the mobile device 122. The RSSI may decrease proportionally to the square of the distance from the source of the signal. The positioning technique may analyze cellular signals received from multiple towers or cells. Position may be calculated from triangulation of the cellular signals. Several positioning techniques may be specialized for indoor applications such as pseudolites (GPS-like short range beacons), ultra-sound positioning, Bluetooth Low Energy (BTLE) signals (e.g., High-Accuracy Indoor Positioning, HAIP) and WiFi-Fingerprinting. Lane level map matching may also be performed using multiple probes from a device 122, for example by tracking the trajectory of the vehicle to determine lane changes or maneuvers. The result of the lane level map matcher is lane level positions or identifiers for the probe data.

The probe data may be collected over time and include timestamps. In some examples, the probe data is collected at a predetermined time interval (e.g., every second, ever 100 milliseconds, or another interval). The probe data may also describe the speed, or velocity, of the mobile device 122. The speed may be determined from the changes of position over a time span calculated from the difference in respective timestamps. The time span may be the predetermined time interval, that is, sequential probe data may be used. In some examples, the probe data is collected in response to movement by the device 122 (i.e., the probe report's location information when the device 122 moves a threshold distance). The predetermined time interval for generating the probe data may be specified by an application or by the user. The interval for providing the probe data from the mobile device 122 to the server 125 may be may the same or different than the interval for collecting the probe data. The interval may be specified by an application or by the user.

The one or more devices 122 may be in communication with the sensors or may directly acquire information or data about a vehicle or the roadway. In an example, the one or more devices 122 may communicate with a vehicle's engine control unit (ECU) that controls a series of actuators on an internal combustion engine to ensure optimal engine performance. The ECU data may be provided in the probe reports. Braking sensors or other sensors configured to measure vehicle dynamics may provide information for the probe reports. A headlight sensor, wiper sensor, fog light sensor, etc. may also communicate with the one or more devices 122. The one or more devices 122 may also be configured to acquire image data using one or more cameras embedded in or in communication with the one or more devices 122. The image data may be included with the probe data and may be transmitted to the mapping system 121 for storage in the geographic database 123 and processing by the server 125. The image data may include metadata, for example, attributes about an image, such as its height and width, in pixels. The metadata may describe the content of the image, the date and time of the image, etc.

The one or more devices 122 may communicate probe data/reports to the server 125 or mapping system 121 using the network 127. The network 127 may include wired networks, wireless networks, or combinations thereof. The wireless network may be a cellular telephone network, LTE (Long-Term Evolution), 4G LTE, a wireless local area network, such as an 802.11, 802.16, 802.20, WiMAX (Worldwide Interoperability for Microwave Access) network, DSRC (otherwise known as WAVE, ITS-G5, or 802.11p and future generations thereof), a 5G wireless network, or wireless short-range network such as Zigbee, Bluetooth Low Energy, Z-Wave, RFID and NFC. Further, the network 127 may be a public network, such as the Internet, a private network, such as an intranet, or combinations thereof, and may utilize a variety of networking protocols now available or later developed including, but not limited to transmission control protocol/internet protocol (TCP/IP) based networking protocols. The devices 122 may use Vehicle-to-vehicle (V2V) communication to wirelessly exchange information about their speed, location, heading, and roadway conditions with other vehicles, devices 122, or the mapping system 121. The devices 122 may use V2V communication to broadcast and receive omni-directional messages creating a 360-degree "awareness" of other vehicles in proximity of the vehicle. Vehicles equipped with appropriate software may use the messages from surrounding vehicles to determine potential threats or obstacles as the threats develop. The devices 122 may use a V2V communication system such as a Vehicular ad-hoc Network (VANET).

The mapping system 121 is configured to acquire/receive and store the probe data. To communicate with the devices 122, systems or services, the mapping system 121 is connected to the network 127. The mapping system 121 may receive or transmit data through the network 127. The mapping system 121 may also transmit paths, routes, or probe data through the network 127. The mapping system 121 may also be connected to an OEM cloud that may be used to provide mapping services to vehicles via the OEM cloud or directly by the mapping system 121 through the network 127.

The server(s) 125/mapping server 125 may be a host for a website or web service such as a mapping service and/or a navigation service. The mapping service may provide standard maps or HD maps generated from the geographic data of the database 123, and the navigation service may generate routing or other directions from the geographic data of the database 123. The mapping service may also provide information generated from attribute data included in the database 123. The server 125 may also provide historical, future, recent or current data for the links, segments, paths, or routes using historical, recent, or real-time collected data. The server 125 is configured to communicate with the devices 122 through the network 127. The server 125 is configured to receive a request from a device 122 for a route or maneuver instructions and generate one or more potential routes or instructions using data stored in the geographic database 123. The server 125 may also be configured to provide up to date information and maps to external geographic databases or mapping applications.

The mapping system 121 and/or server 125 is configured to perform real-time lane level traffic processing. In an embodiment, the server 125 is configured to receive probe data from the one or more devices 122, map match the probe data, determine probe paths, allocate travel times to lanes, aggregate the travel times, calculate a representative traffic record for each lane, and publish the representative traffic record. This is performed in real-time or at regular intervals in order to provide real-time lane level traffic reporting and monitoring.

Figure 2:
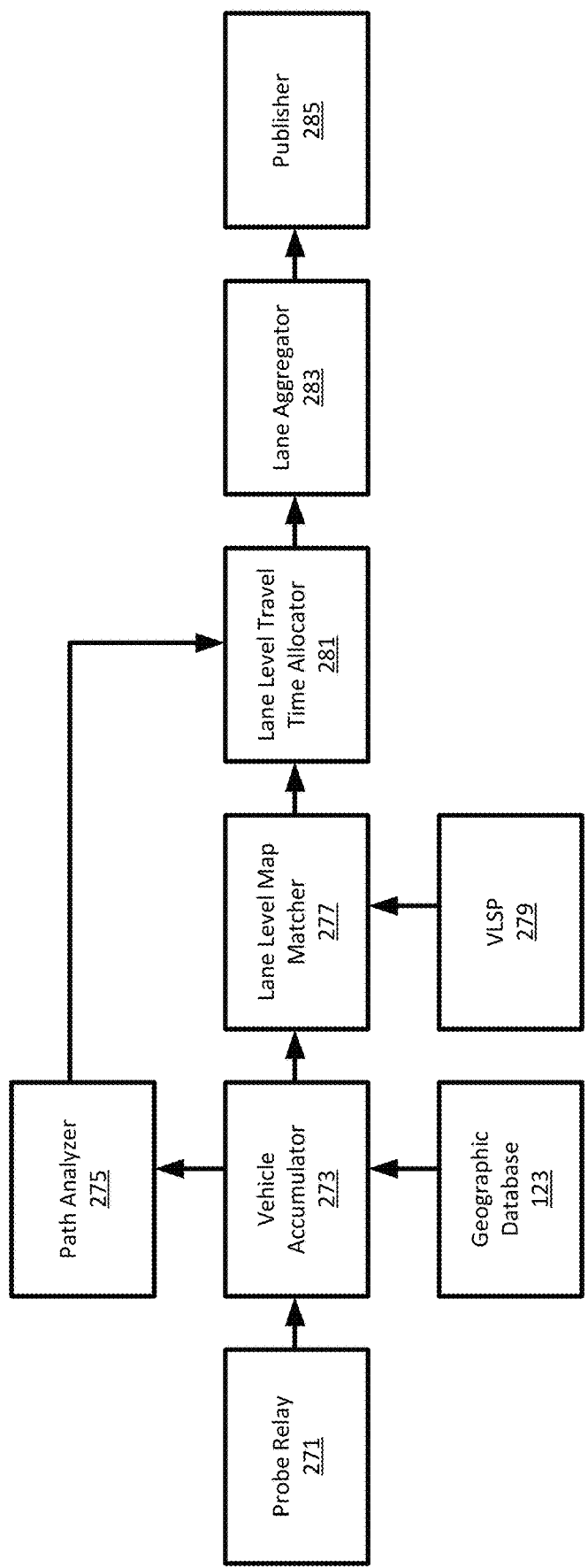
FIG. 2 depicts an example architecture for real-time lane level traffic processing according to an embodiment.

FIG. 2 depicts an example architecture for real-time lane level traffic processing. In FIG. 2, probe data is acquired by the probe relay 271 that receives probe data from devices 122 or other sources. The probe relay 271 passes the probe data to the vehicle accumulator 273. The vehicle accumulator 273 is configured to group the probe data by probes and to map match the probe data to a link using, for example, data from the geographic database 123. The path analyzer 275 receives the map matched probe data for each device 122 and generates a probe path for the device 122. The lane level map matcher 277 matches the probe data at a lane level. The probe path and lane level information are input into the lane level travel time allocator 281. The lane level travel time allocator 281 allocates travel time to respective links and lanes. The lane aggregator 283 aggregates lane level travel times to generate a traffic record for each lane. The traffic record, for example an average speed, is published by the publisher 285.

Embodiments of the subject matter described herein may be implemented in a computing system that includes a back end component, e.g., a data server, or that includes a middleware component, e.g., an application server, or that includes a front end component, e.g., a client computer having a graphical user interface or a Web browser through which a user may interact with an implementation of the subject matter described in this specification, or any combination of one or more such back end, middleware, or front end components. The components of the system may be interconnected by any form or medium of digital data communication, e.g., a communication network.

The probe relay 271 is configured to receive probe data from a probe vehicle/device 122. Probe data 122 may be continuously received as it is generated by probe devices 122 or may be batched or stored until accessed by the probe relay 271. The probe data includes at least timestamps, a device ID, and positional data (for example lat/lon). The probe relay 271 may be implemented as a separate component or as one or more logic components, such as on an FPGA which may include a memory or reconfigurable component to store logic and a processing component to execute the stored logic, or as first logic, e.g., computer program logic, stored in a memory or other non-transitory computer readable medium, and executable by a processor to cause the server 125 to, or otherwise be operative to receive probe data.

Figure 3:
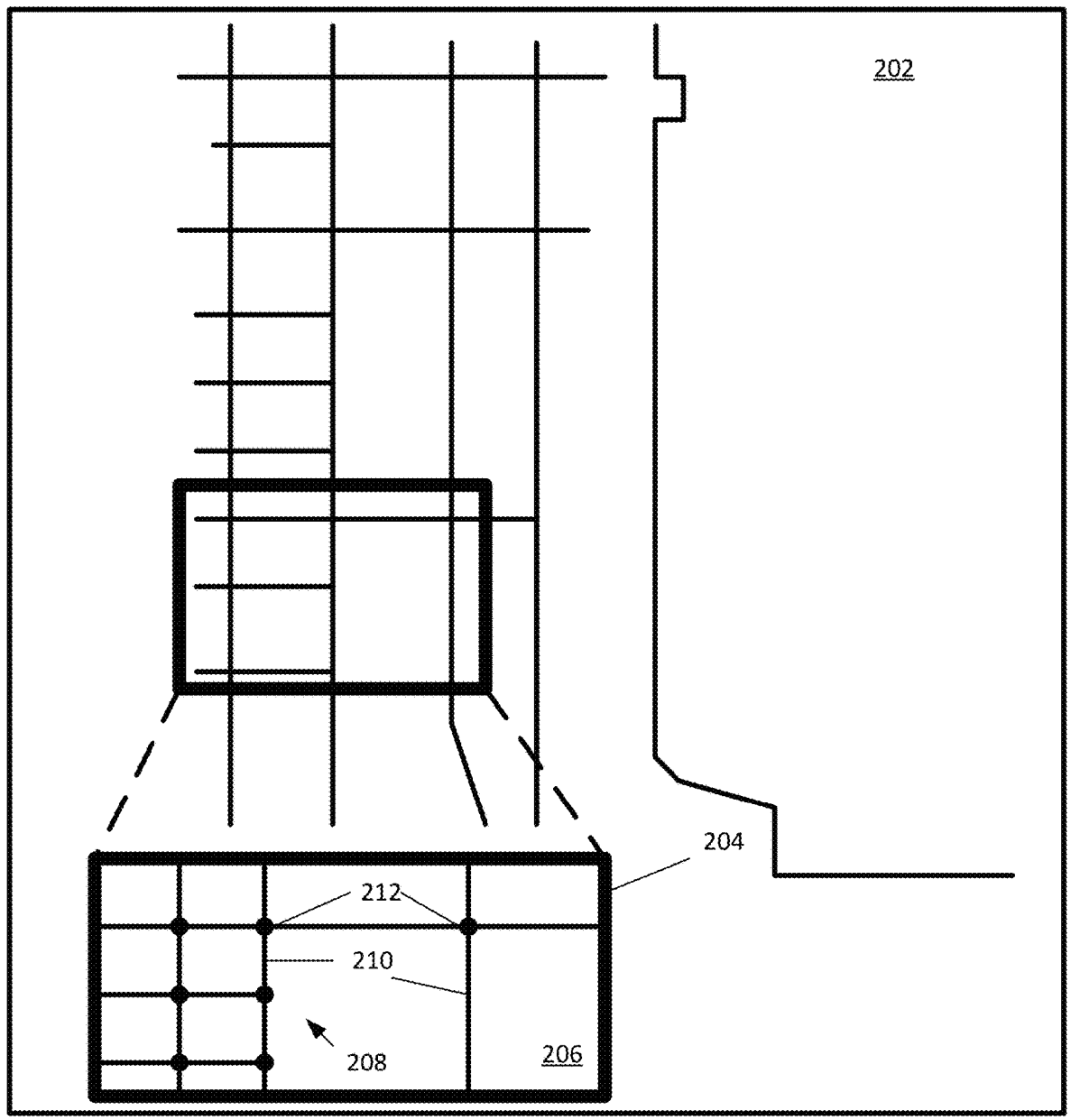
FIG. 3 depicts an example region of a geographic database.

The geographic database 123 is configured to provide mapping data for use in map matching the probe data, for example by providing roadway configurations that can be matched to the positional coordinates included in the probe data. FIG. 3 illustrates a map of a geographic region 202. The geographic region 202 may correspond to a metropolitan or rural area, a state, a country, or combinations thereof, or any other area. Located in the geographic region 202 are physical geographic features, such as roads, points of interest (including businesses, municipal facilities, etc.), lakes, rivers, railroads, municipalities, etc.

FIG. 3 further depicts an enlarged map 204 of a portion 206 of the geographic region 202. The enlarged map 204 illustrates part of a road network 208 in the geographic region 202. The road network 208 includes, among other things, roads and intersections located in the geographic region 202. As shown in the portion 206, each road in the geographic region 202 is composed of one or more road segments 210. A road segment 210 represents a portion of the road. Road segments 210 may also be referred to as links. Each road segment 210 is shown to have associated with it one or more nodes 212; one node represents the point at one end of the road segment and the other node represents the point at the other end of the road segment. The node 212 at either end of a road segment 210 may correspond to a location at which the road meets another road, i.e., an intersection, or where the road dead ends.

Figure 4:
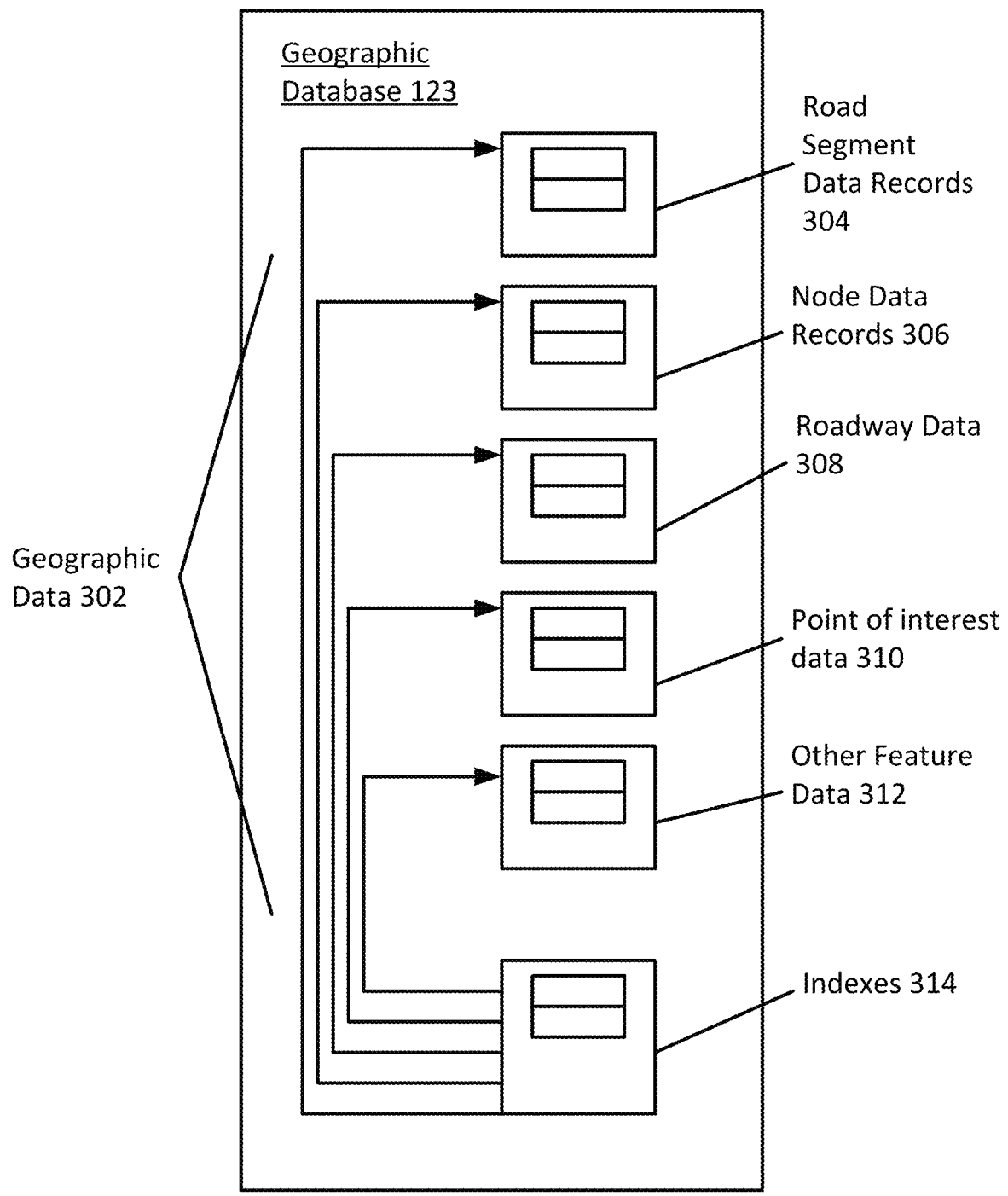
FIG. 4 depicts an example geographic database of FIG. 1.

As depicted in FIG. 4, in one embodiment, the geographic database 123 contains geographic data 302 that represents some of the geographic features in the geographic region 202 depicted in FIG. 3. The data 302 contained in the geographic database 123 may include data that represent the road network 208. In FIG. 4, the geographic database 123 that represents the geographic region 202 may contain at least one road segment database record 304 (also referred to as "entity" or "entry") for each road segment 210 in the geographic region 202. The geographic database 123 that represents the geographic region 202 may also include a node database record 306 (or "entity" or "entry") for each node 212 in the geographic region 202. The terms "nodes" and "segments" represent only one terminology for describing these physical geographic features, and other terminology for describing these features is intended to be encompassed within the scope of these concepts.

The geographic database 123 may include feature data 308-312. The feature data 312 may represent types of geographic features. For example, the feature data may include roadway data 308 including signage data, lane data, traffic signal data, physical and painted features like dividers, lane divider markings, road edges, center of intersection, stop bars, overpasses, overhead bridges, etc. The roadway data 308 may be further stored in sub-indices that account for different types of roads or features. The point of interest data 310 may include data or sub-indices or layers for different types of points of interest. The point of interest data may include point of interest records comprising a type (e.g., the type of point of interest, such as restaurant, fuel station, hotel, city hall, police station, historical marker, ATM, golf course, truck stop, vehicle chain-up stations, etc.), location of the point of interest, a phone number, hours of operation, etc. The feature data 312 may include other roadway features.

The geographic database 123 also includes indexes 314. The indexes 314 may include various types of indexes that relate the different types of data to each other or that relate to other aspects of the data contained in the geographic database 123. For example, the indexes 314 may relate the nodes in the node data records 306 with the end points of a road segment in the road segment data records 304.

Figure 5:
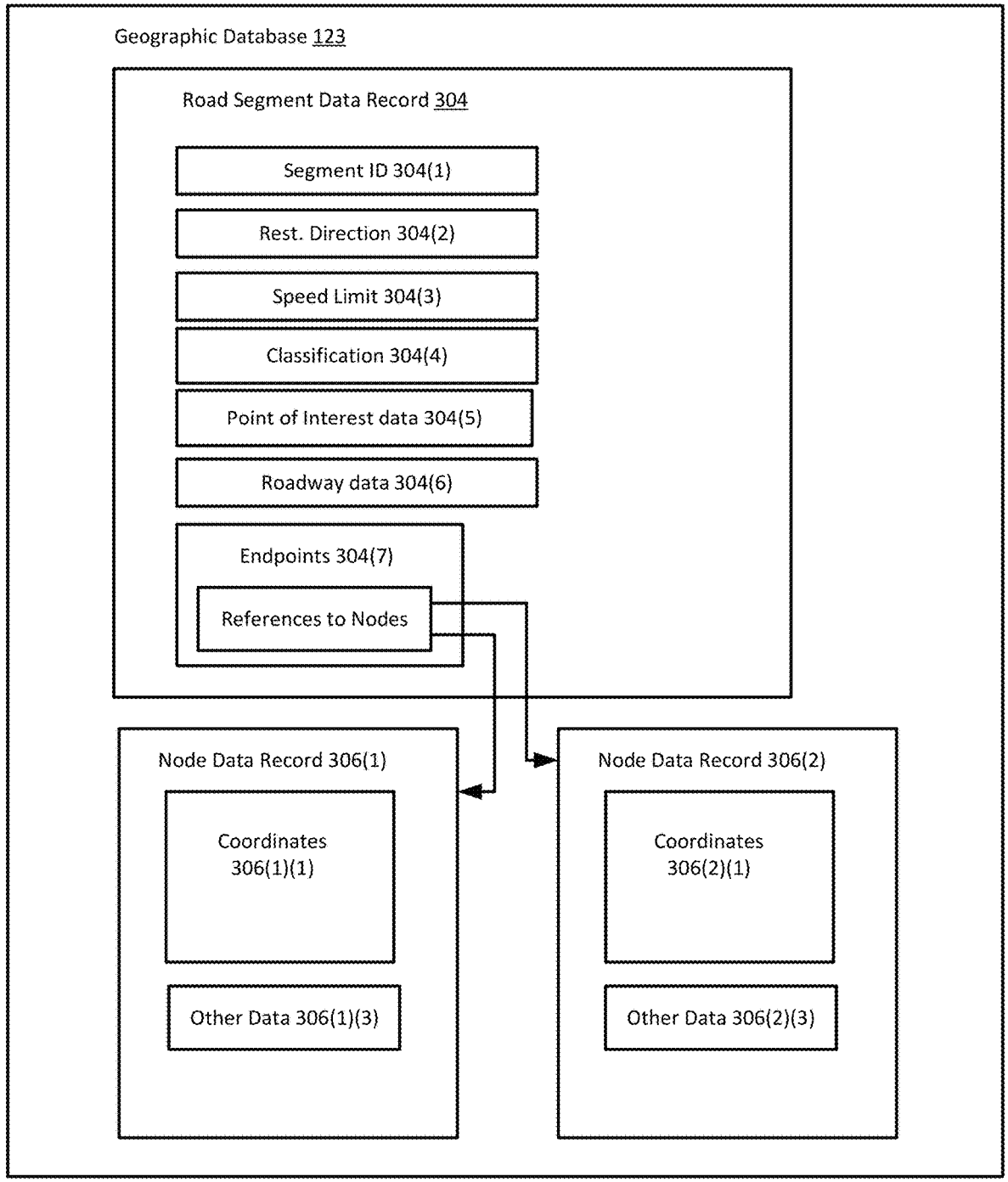
FIG. 5 depicts an example structure of the geographic database.

FIG. 5 shows some of the components of a road segment data record 304 contained in the geographic database 123 according to one embodiment. The road segment data record 304 may include a segment ID 304(1) by which the data record can be identified in the geographic database 123. Each road segment data record 304 may have associated information such as "attributes", "fields", etc. that describes features of the represented road segment. The road segment data record 304 may include data 304(2) that indicate the restrictions, if any, on the direction of vehicular travel permitted on the represented road segment. The road segment data record 304 may include data 304(3) that indicate a speed limit or speed category (i.e., the maximum permitted vehicular speed of travel) on the represented road segment. The road segment data record 304 may also include classification data 304(4) indicating whether the represented road segment is part of a controlled access road (such as an expressway), a ramp to a controlled access road, a bridge, a tunnel, a toll road, a ferry, and so on. The road segment data record 304 may include data 304(5) related to points of interest. The road segment data record 304 may include data 304(6) that describes lane configurations. The road segment data record 304 also includes data 304(7) providing the geographic coordinates (e.g., the latitude and longitude) of the end points of the represented road segment. In one embodiment, the data 304(7) are references to the node data records 306 that represent the nodes corresponding to the end points of the represented road segment. The road segment data record 304 may also include or be associated with other data 304(7) that refer to various other attributes of the represented road segment such as coordinate data for shape points, points of interest (POIs), signage, other parts of the road segment, etc. The various attributes associated with a road segment may be included in a single road segment record or may be included in more than one type of record which cross-references each other. For example, the road segment data record 304 may include data identifying what turn restrictions exist at each of the nodes which correspond to intersections at the ends of the road portion represented by the road segment, the name or names by which the represented road segment is known, the street address ranges along the represented road segment, and so on.

FIG. 5 also shows some of the components of a node data record 306 which may be contained in the geographic database 123. Each of the node data records 306 may have associated information (such as "attributes", "fields", etc.) that allows identification of the road segment(s) that connect to it and/or a geographic position (e.g., latitude and longitude coordinates). For the embodiment shown in FIG. 5, the node data records 306(1) and 306(2) include the latitude and longitude coordinates 306(1)(1) and 306(2)(1) for their node. The node data records 306(1) and 306(2) may also include other data 306(1)(3) and 306(2)(3) that refer to various other attributes of the nodes.

The data in the geographic database 123 may be organized using a graph that specifies relationships between entities. A location graph is a graph that includes relationships between location objects in a variety of ways. Objects and their relationships may be described using a set of labels. Objects may be referred to as "nodes" of the location graph, where the nodes and relationships among nodes may have data attributes. The organization of the location graph may be defined by a data scheme that defines the structure of the data. The organization of the nodes and relationships may be stored in an ontology which defines a set of concepts where the focus is on the meaning and shared understanding. These descriptions permit mapping of concepts from one domain to another. The ontology is modeled in a formal knowledge representation language which supports inferencing and is readily available from both open-source and proprietary tools.

Referring back to FIG. 2, the Vehicle Accumulator 273 is configured to group and map match the probe data from the probe relay using data from the geographic database 123. Map-matching (MM) algorithms integrate positioning data with spatial road network data to identify the correct link on which a vehicle is travelling and determine the location of a vehicle/device 122 on a link. The vehicle accumulator 273 may provide link level map matching. Link level map matching may use historical data (such as the previously matched road segment from a previous probe data), vehicle speed and topological information on the spatial road network (such as link connectivity). A point-based map matcher or path-based map matcher may be used. For a path-based map matcher, the vehicle accumulator 273 may provide map matching using a Sliding Viterbi Map-matcher (SVMM) for link level map matching. SVMM may use probability theory to identify the set of candidate segments by taking into account the error sources associated with both navigation sensors and spatial road data. Other real-time map matching algorithms may be used by the vehicle accumulator 273. The vehicle accumulator 273 is also configured to group or gather probes from a same device and input the set of probes into the path analyzer to generate a probe path. The vehicle accumulator 273 may be implemented as a separate component or as one or more logic components, such as on an FPGA which may include a memory or reconfigurable component to store logic and a processing component to execute the stored logic, or as first logic, e.g., computer program logic, stored in a memory or other non-transitory computer readable medium, and executable by a processor to cause the server 125 to, or otherwise be operative to group probe data by device 122 and map match the probe data to at least a link segment.

The lane level map matcher 277 is configured to further map match the probe data to a lane. Different lane level map matching techniques may be used that, for example, build upon the link level map matching performed by the vehicle accumulator 273. In an embodiment, the latitude and longitude of probe data of each vehicle is compared to previously calculated lane probabilities. This map matching technique uses a "d-value" that is the displacement value of the latitude and longitude relative to a centerline of the identified link. A layer of abstraction is created over a map of the road strand/road segment as the virtual lane speed profile to generate the lane probabilities of probe data points based on their lateral positions (d-value) relative to the link. These form the emission probabilities of a Hidden Markov Model (HMM) in which the Viterbi algorithm may be used to make inference of the most probable lane(s) of a probe trajectory. Based on the most probable lane(s), a probe trajectory including two or more probes from the same vehicle is map-matched on a lane level to a lane as the vehicle traverses the road segment.

In another example, under the probabilistic approach, the lane level map matcher 277 uses the raw GPS probe positions (e.g., links+latitude (lat) and longitude (lon)) for each probe to create a layer of abstraction over a digital map, for example provided by the geographic database 123 or the VLSP 279. The VLSP 279 stores the probabilities for previous probe locations. The lane level map matcher 277 uses the abstraction layer (<Link-ID>, <d-value>) to generate lane probabilities of probes based on their lateral position (lane distance (d-value)) within a road segment. In one embodiment, the generated lane probabilities form the emission probabilities of a statistical model (e.g., a Hidden Markov Model (HMM)) that the lane level map matcher 277 may use to make an inference of the actual most probable lane(s) a probe trajectory traversed (e.g., one or more lanes of a multi-lane road). In one instance, the lane level map matcher 277 may use a dynamic programming algorithm (e.g., the Viterbi algorithm) to make this inference.

The lane level map matcher 277 may be implemented as a separate component or as one or more logic components, such as on an FPGA which may include a memory or reconfigurable component to store logic and a processing component to execute the stored logic, or as first logic, e.g., computer program logic, stored in a memory or other non-transitory computer readable medium, and executable by a processor to cause the server 125 to, or otherwise be operative to map match the probe data to at least a lane of the link segment.

The path analyzer 275 is configured to generate a probe path based on the map matched probe data. The path analyzer 275 identifies a list of links that the probe device 122 traversed. These links may not all be represented by the probe data depending on the frequency of the probes. For example, a first probe may indicate that the device was on a first link and a second probe may indicate that the device 122 was on a third link. During the gap in time, the device 122 had to traverse a second link. Similarly, the path analyzer 275 determines any turns or changes to different links. The path analyzer 275 may be implemented as a separate component or as one or more logic components, such as on an FPGA which may include a memory or reconfigurable component to store logic and a processing component to execute the stored logic, or as first logic, e.g., computer program logic, stored in a memory or other non-transitory computer readable medium, and executable by a processor to cause the server 125 to, or otherwise be operative to generate a probe-path based on the map matched probe data.

The lane level travel time allocator 281 is configured to allocate lane level travel time to every link in the probe path. The lane level travel time allocator 281 determines if a device 122 traversed a lane during the probe path and if so, allocates at least path of the probe path to the respective lane. The lane level travel time allocator 281 is configured to duplicate the probe path if needed based on the following logic.

The algorithm is based on the delta between the last and the first probe map matched lane in the probe path. If $|\Delta(P2L-P1L)|=0$ then 1 probe path (i.e., probe stayed on same lane). Else if $|\Delta(P2L-P1L)|=1$ then duplicate probe path across both lanes. (i.e., create two probe-path speed for both lanes). Else if $|\Delta(P2L-P1L)|>1$ then filter out the probe path (i.e., drop the probe-path).

Figure 6:
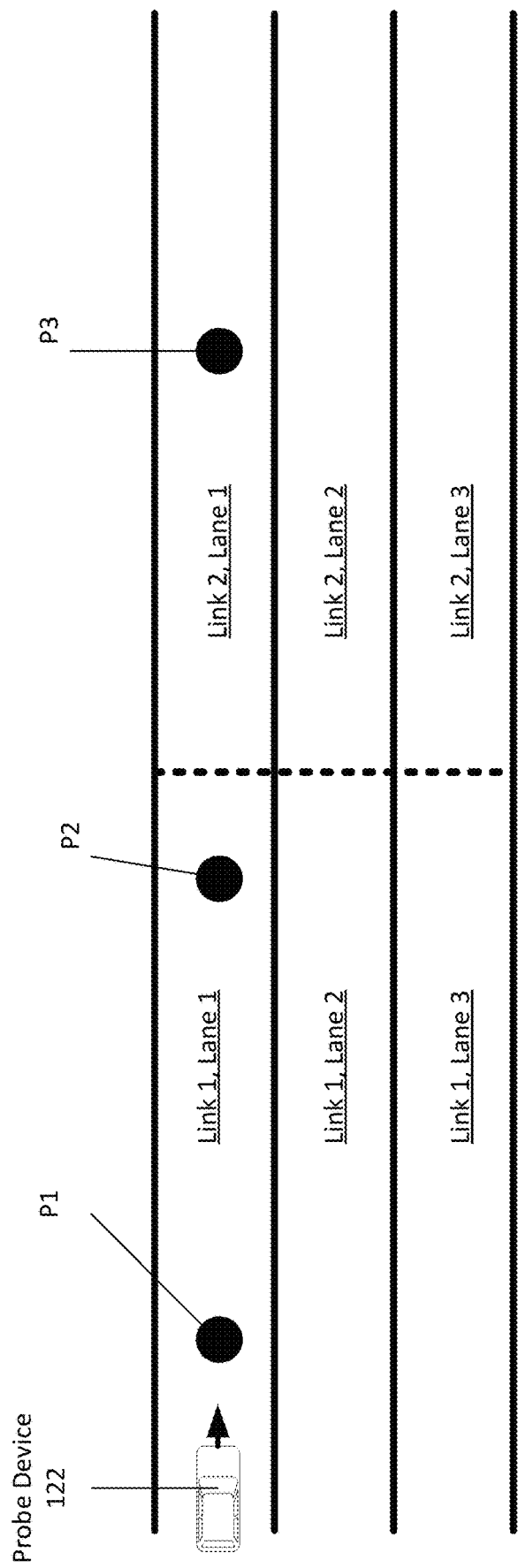
FIGS. 6-10 depict example scenarios for real-time lane level traffic processing according to an embodiment.

FIGS. 6-10 depicts examples of possible scenarios. In FIG. 6, there are two links (Link 1, Link 2) each with three lanes (Lane 1, Lane 2, Lane 3). There is a probe device 122 and three probe points (P1, P2, P3) that are generated by the probe device 122 as it traverses Link 1 and Link 2. P1 is acquire at a time T1, P2 at a time T2, P3 at a time T3. T1, T2, and T3 occur sequentially. This probe data is provided to the probe relay. The probe data is map matched to respective links by the vehicle accumulator and the lane level map matcher. In FIG. 6, P1 has been map matched to Link 1, Lane 1. P2 is map matched to Link 1, Lane 1. P3 has been map matched to Link 2, Lane 2. The path analyzer generates a probe path for the probe device 122. The probe path of the probe device 122 in FIG. 6 indicates that the probe device 122 stayed in Lane 1 for the entire section of this trip. In this scenario, the lane level travel time allocator allocates all of the travel time for link 1 to lane 1 and for link 2 to lane 2. This data may then be aggregated with other probe data for these lanes as described below and published by the publisher.

Figure 7:
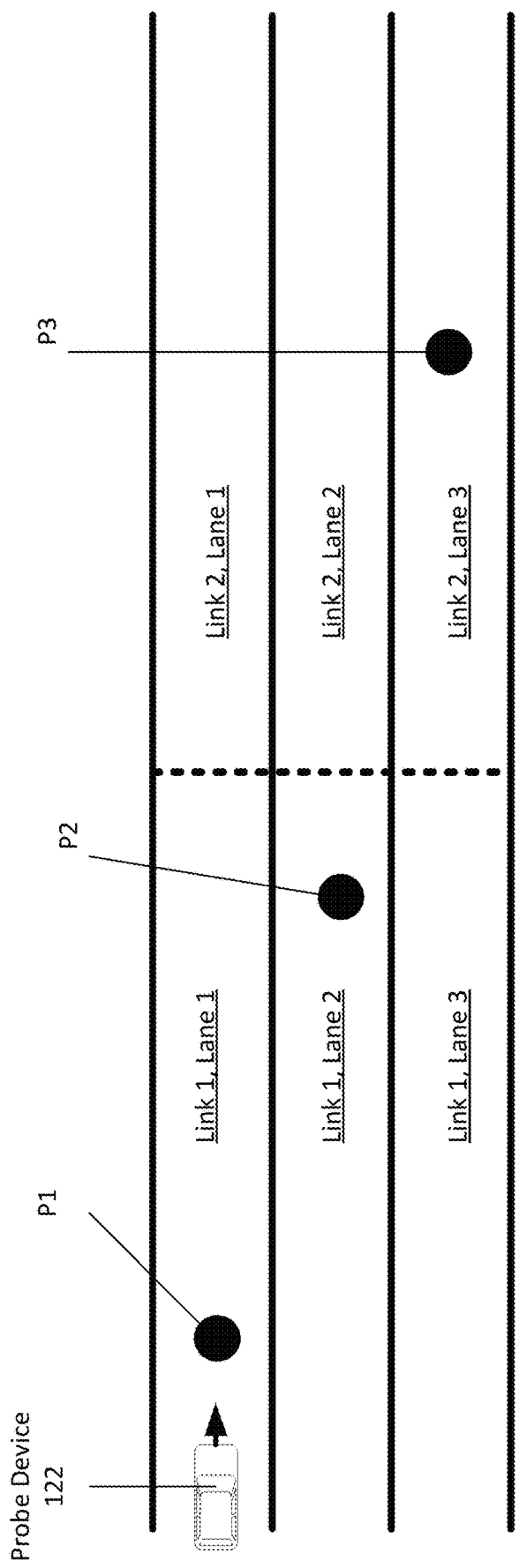

In FIG. 7, there are two links (Link 1, Link 2) each with three lanes (Lane 1, Lane 2, Lane 3). There is a probe device 122 and three probe points (P1, P2, P3) that are generated by the probe device 122 as it traverses Link 1 and Link 2. P1 is acquire at a time T1, P2 at a time T2, P3 at a time T3. T1, T2, and T3 occur sequentially. This probe data is provided to the probe relay. The probe data is map matched to respective links by the vehicle accumulator and the lane level map matcher. In FIG. 7, P1 has been map matched to Link 1, Lane 1. P2 is map matched to Link 1, Lane 2. P3 has been map matched to Link 2, Lane 3. The path analyzer generates a probe path for the probe device 122. The probe path of the probe device 122 in FIG. 7 indicates that the probe device 122 crossed from lane 1 to lane 3 over the period of time between T1 and T3. In this scenario, the lane level travel time allocator allocates the travel time for link 1 to both lane 1 and lane 2 by duplicating the probe path. For link 2, the travel time allocator allocates the travel time for link 1 to both lane 2 and lane 3 as these lanes were potentially traversed by the probe device 122. This data may then be aggregated with other probe data for these lanes as described below and published by the publisher.

Figure 8:
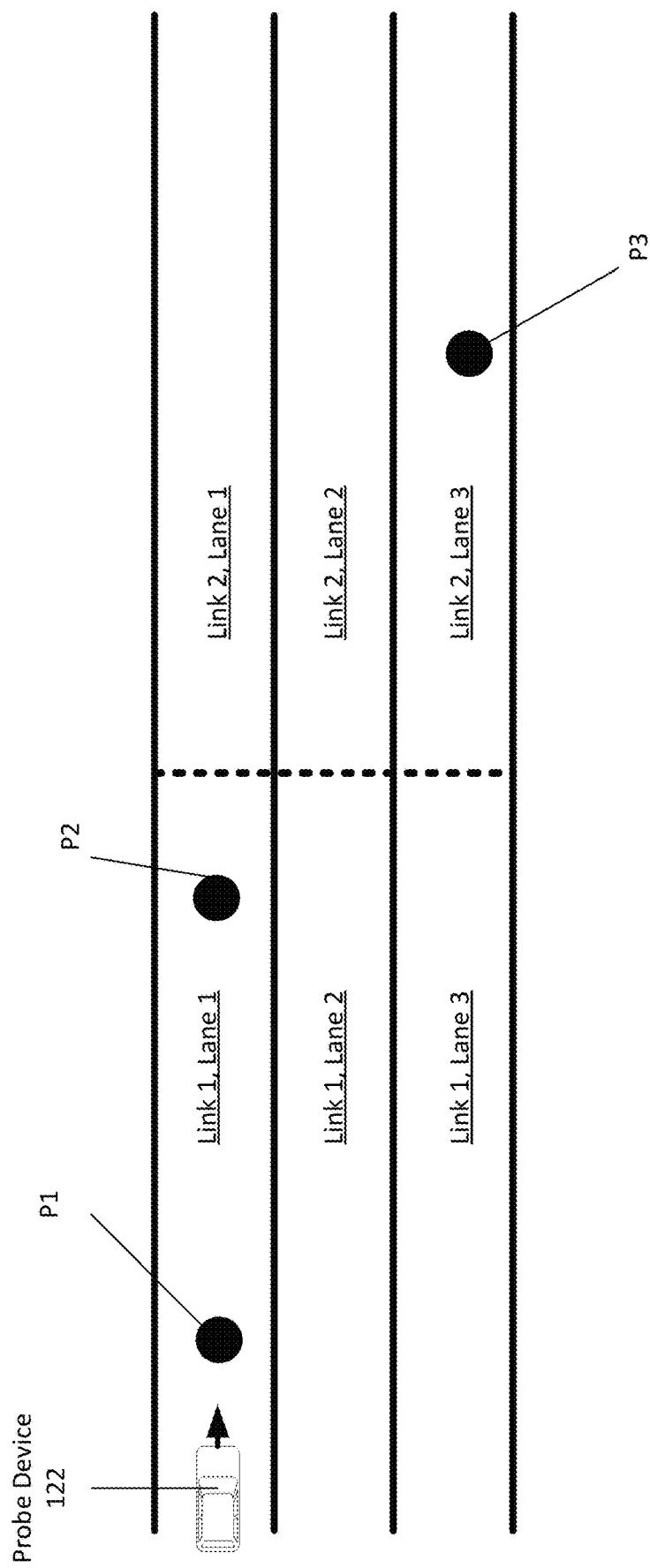

In FIG. 8, there are two links (Link 1, Link 2) each with three lanes (Lane 1, Lane 2, Lane 3). There is a probe device 122 and three probe points (P1, P2, P3) that are generated by the probe device 122 as it traverses Link 1 and Link 2. P1 is acquire at a time T1, P2 at a time T2, P3 at a time T3. T1, T2, and T3 occur sequentially. This probe data is provided to the probe relay. The probe data is map matched to respective links by the vehicle accumulator and the lane level map matcher. In FIG. 8, P1 has been map matched to Link 1, Lane 1. P2 is map matched to Link 1, Lane 1. P3 has been map matched to Link 2, Lane 3. The path analyzer generates a probe path for the probe device 122. The probe path of the probe device 122 in FIG. 8 indicates that the probe device 122 crossed from lane 1 to lane 3 at some point between P2 and P3. In this scenario, the lane level travel time allocator allocates the travel time for link 1 to lane 1 and filters out the travel time for lanes 2 and 3 as the travel time is indeterminate. This data may then be aggregated with other probe data for these lanes as described below and published.

Figure 9:
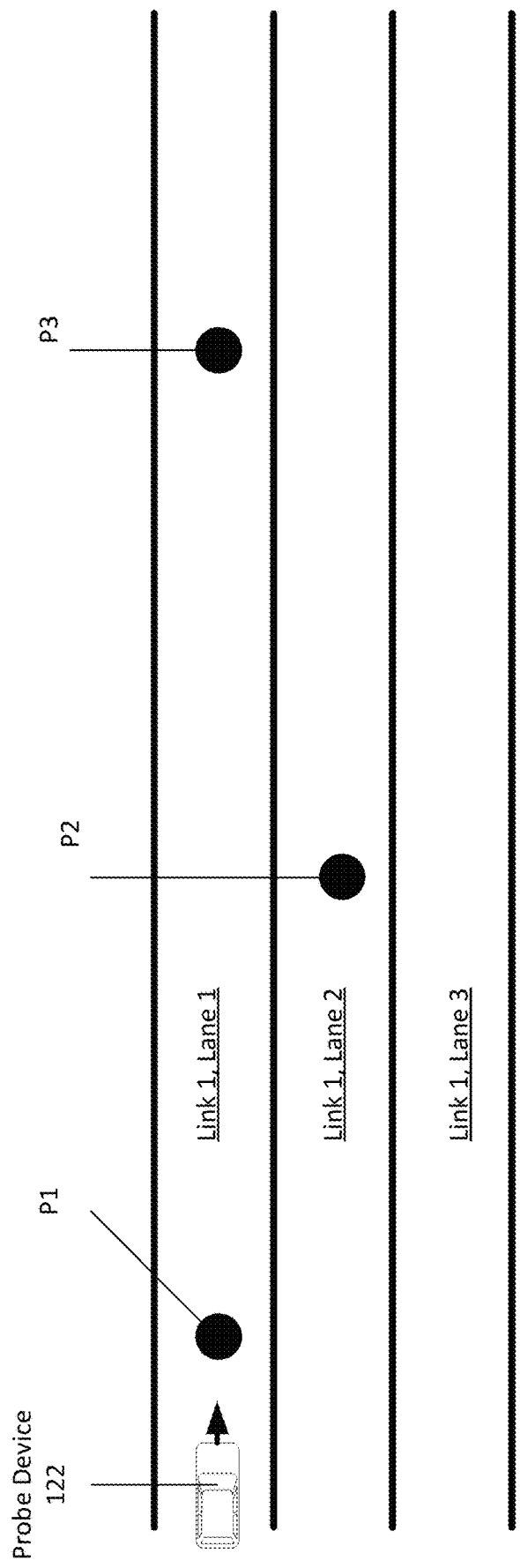

In FIG. 9, there is one link (Link 1) with three lanes (Lane 1, Lane 2, Lane 3). There is a probe device 122 and three probe points (P1, P2, P3) that are generated by the probe device 122 as it traverses Link 1. P1 is acquire at a time T1, P2 at a time T2, P3 at a time T3. T1, T2, and T3 occur sequentially. This probe data is provided to the probe relay. The probe data is map matched to respective links by the vehicle accumulator and the lane level map matcher. In FIG. 9, P1 has been map matched to Link 1, Lane 1. P2 is map matched to Link 1, Lane 2. P3 has been map matched to Link 1, Lane 1. The path analyzer generates a probe path for the probe device 122. The probe path of the probe device 122 in FIG. 9 indicates that the probe device 122 changed from lane 1 to lane 2 and then back again. In this scenario, the lane level travel time allocator duplicates the probe path and allocates the travel time to both lane 1 and lane 2. This data may then be aggregated with other probe data for these lanes as described below and published by the publisher.

Figure 10:
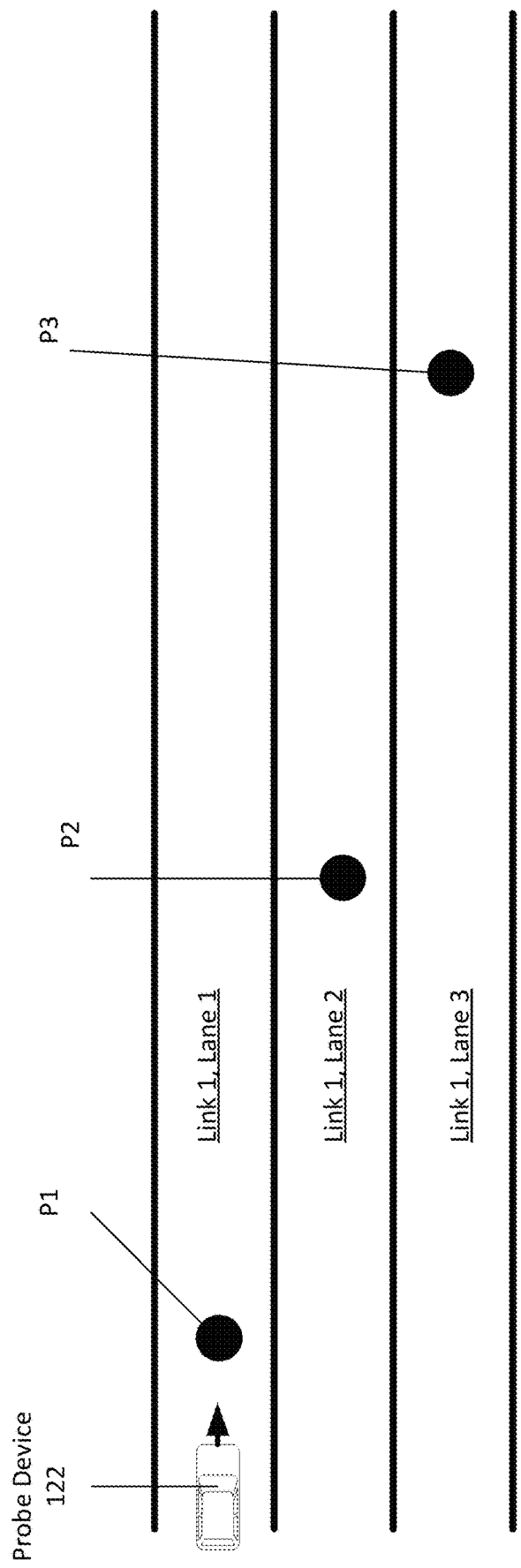

In FIG. 10, there is one links (Link 1) with three lanes (Lane 1, Lane 2, Lane 3). There is a probe device 122 and three probe points (P1, P2, P3) that are generated by the probe device 122 as it traverses Link 1 and Link 2. P1 is acquire at a time T1, P2 at a time T2, P3 at a time T3. T1, T2, and T3 occur sequentially. This probe data is provided to the probe relay. The probe data is map matched to respective links by the vehicle accumulator and the lane level map matcher. In FIG. 10, P1 has been map matched to Link 1, Lane 1. P2 is map matched to Link 1, Lane 2. P3 has been map matched to Link 1, Lane 3. The path analyzer generates a probe path for the probe device 122. The probe path of the probe device 122 in FIG. 10 indicates that the probe device 122 crossed from lane 1 to lane 2 to lane 3 while on link 1. In this scenario, the lane level travel time allocator duplicates the probe paths for all lanes and allocated the travel time to each lane. This data may then be aggregated with other probe data for these lanes as described below and published by the publisher.

The lane level travel time allocator 281 may be implemented as a separate component or as one or more logic components, such as on an FPGA which may include a memory or reconfigurable component to store logic and a processing component to execute the stored logic, or as first logic, e.g., computer program logic, stored in a memory or other non-transitory computer readable medium, and executable by a processor to cause the server 125 to, or otherwise be operative to allocate travel time to one or more lanes from the probe path.

The lane aggregator 283 is configured to collect all the travel times on a specific lane and periodically (every epoch) producing a traffic record for the lane. The traffic record may be an average speed of all the vehicles that traversed the lane in the current epoch. Different traffic records may be used and/or weighted differently by the lane aggregator 283. In an example, the lane aggregator 283 may weight newer travel times from newer probe data more than older travel times/probe data. The lane aggregator 283 may be implemented as a separate component or as one or more logic components, such as on an FPGA which may include a memory or reconfigurable component to store logic and a processing component to execute the stored logic, or as first logic, e.g., computer program logic, stored in a memory or other non-transitory computer readable medium, and executable by a processor to cause the server 125 to, or otherwise be operative to aggregate all the travel times for a specific lane and produce a traffic record for the specific lane.

The publisher 285 is configured to publish or otherwise make available the traffic record. The traffic record may be stored in the geographic database 123. The traffic record may be used by navigation devices 122 or the server 125 to generate routes. The traffic record may be used for navigation services, smart city analytics, incident management, DOT planning, autonomous driving, and/or dispatch of safety services from first responders among other uses. The publisher 285 may be implemented as a separate component or as one or more logic components, such as on an FPGA which may include a memory or reconfigurable component to store logic and a processing component to execute the stored logic, or as first logic, e.g., computer program logic, stored in a memory or other non-transitory computer readable medium, and executable by a processor to cause the server 125 to, or otherwise be operative to publish the traffic record.

Another problem is that in transportation research many data scientists and developers do not have access to real-time probes to test out new algorithms in a cost-effective manner. Data scientists are not able to obtain sequential logs of algorithm outputs from production systems as the overhead of producing such data typically exceeds the production costs from the running system in a production environment. Embodiments further provide a local architecture that brings the entire traffic processing pipeline to the scale of a single workstation sized computer box, giving the power and acceleration to the work researchers and data scientists do while incurring zero cost in the production environment resource usage.

The architecture scales across any geography. The solution can be made small enough to cover only a few square kilometers or scale to the whole world, depending on the complexity of the algorithms to be developed. The described architecture is scalable enough to allow multiple versions to be run simultaneously and the output of one or more mules compared to facilitate quality improvement or innovation.

The architecture is further compatible with the production systems allowing the output of the systems and methods described herein to be "overlaid" on the network graph of the production environment. This is helpful to allow a more complex but more accurate algorithm to cover problematics areas of the production system without incurring the overhead of the more complex solution across the whole production system. For development purposes—the architecture does not need to maintain a high availability system and associated redundancy, thereby lowering implementation costs and support resources. Finally, as a standalone box, the system may be shut off or paused when not needed or re-deployed to other researchers when an active campaign is not needed.

Figure 11:
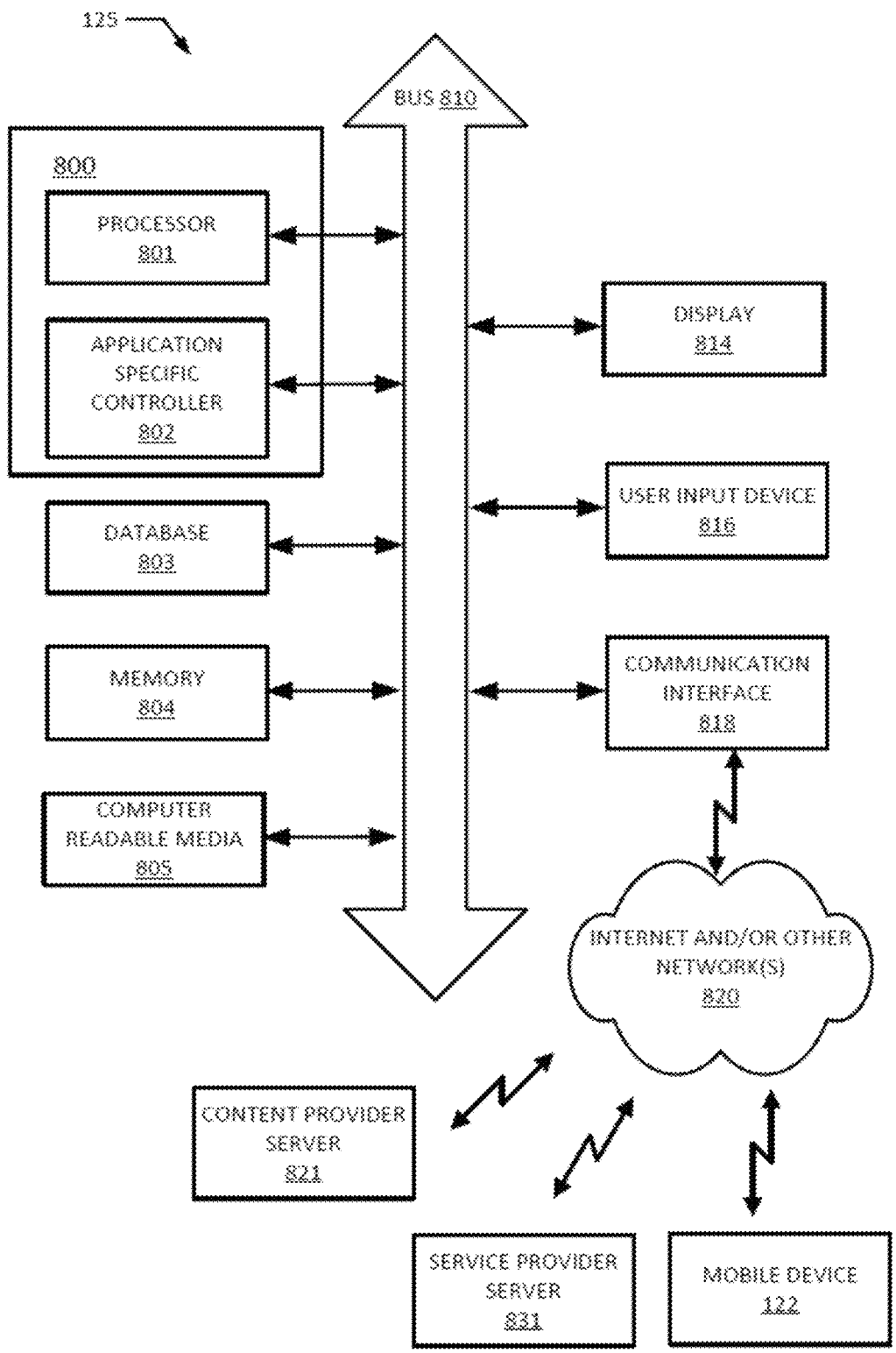
FIG. 11 depicts an example server of FIG. 1 according to an embodiment.

FIG. 11 depicts an example server 125 for the system of FIG. 1 that is configured to real-time lane-level traffic processing. The server 125 may include a bus 810 that facilitates communication between a controller 800 that may be implemented by a processor 801 and/or an application specific controller 802, which may be referred to individually or collectively as the controller 800, and one or more other components including a database 803, a memory 804, a computer readable medium 805, a display 814, a user input device 816, and a communication interface 818 connected to the internet and/or other networks 820. The contents of database 803 are described with respect to database 123. The server-side database 803 may be a master database that provides data in portions to the database of the mobile device 122. Additional, different, or fewer components may be included. The memory 804 and/or the computer readable medium 805 may include a set of instructions that can be executed to cause the server 125 to perform any one or more of the methods or computer-based functions disclosed herein, for example, the components or functions as described in FIG. 1. The server 125 may be in communication through the network 820 with a content provider server 821 and/or a service provider server 831. The server 125 may provide mapping or navigation related services or data to the content provider server 821 and/or the service provider server 831. The content provider may include device manufacturers that provide location-based services.

In a networked deployment, the system of FIG. 11 may alternatively operate or as a client user computer in a client-server user network environment, or as a peer computer system in a peer-to-peer (or distributed) network environment. It can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. While a single computer system is illustrated, the term "system" shall also be taken to include any collection of systems or sub-systems that individually or jointly execute a set, or multiple sets, of instructions to perform one or more computer functions. The server 125 may be in communication through the network 820 with a content provider server 821 and/or a service provider server 831. The server 125 may provide the point cloud to the content provider server 821 and/or the service provider server 831.

Figure 12:
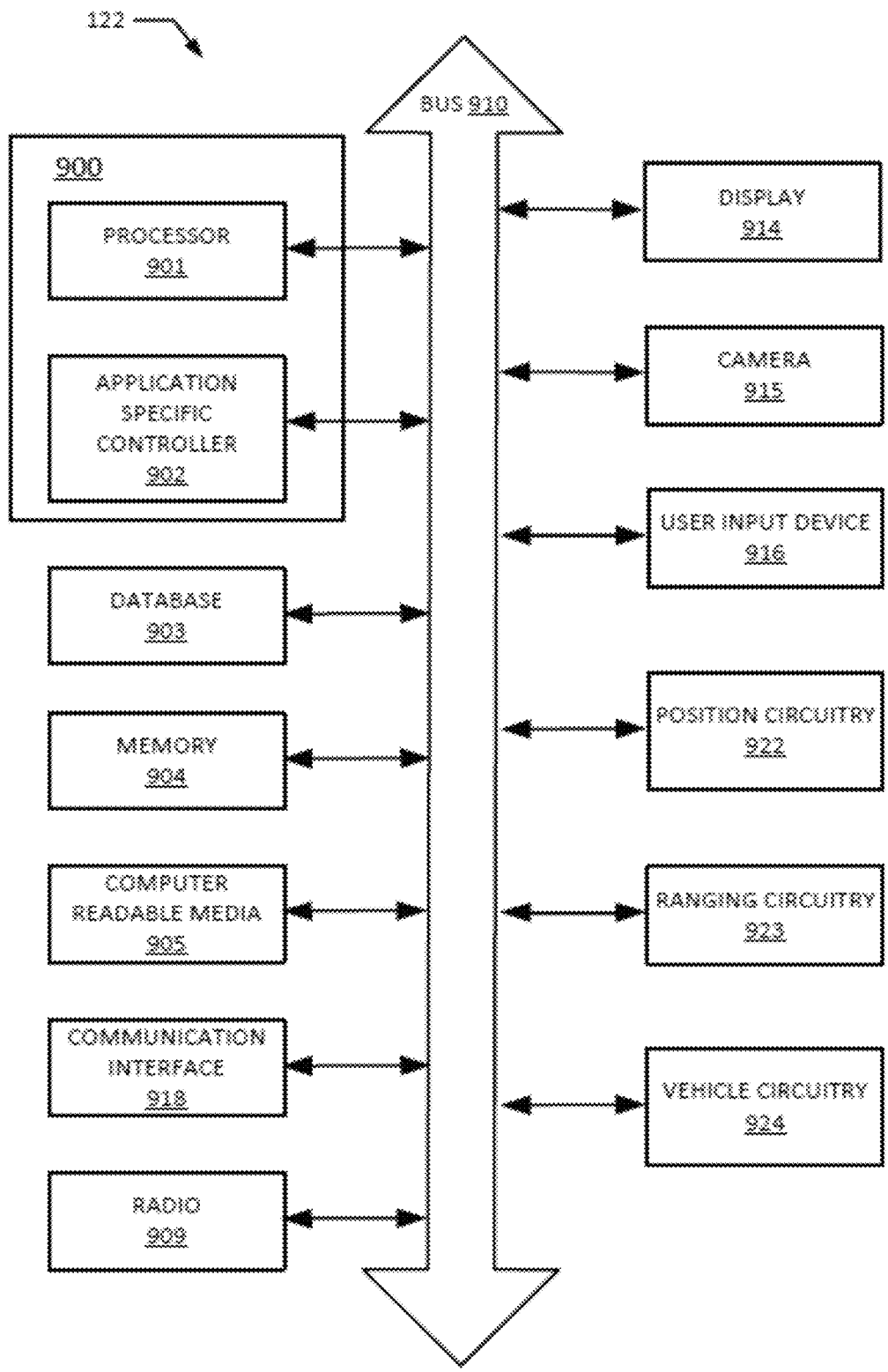
FIG. 12 depicts an example device of FIG. 1 according to an embodiment.

FIG. 12 illustrates an example mobile device 122 for the system of FIG. 1. The mobile device 122 is configured to provide probe data for use in real-time lane-level traffic processing. The mobile device 122 is further configured to receive lane level traffic records from the server 125 and take appropriate actions in response. The mobile device 122 may include a bus 910 that facilitates communication between a controller 900 that may be implemented by a processor 901 and/or an application specific controller 902, which may be referred to individually or collectively as controller 900, and one or more other components including a database 903, a memory 904, a computer readable medium 905, a communication interface 918, a radio 909, a display 914, a camera 915, a user input device 916, position circuitry 922, ranging circuitry 923, and vehicle circuitry 924. The contents of the database 903 are described with respect to the geographic database 123. The device-side database 903 may be a user database that receives data in portions from the database 903 of the mobile device 122. The communication interface 918 connected to the internet and/or other networks (e.g., network 127 shown in FIG. 1). The vehicle circuitry 924 may include any of the circuitry and/or devices described with respect to FIG. 12. Additional, different, or fewer components may be included.

The mobile device 122 may be a personal navigation device ("PND"), a portable navigation device, a mobile phone, a personal digital assistant ("PDA"), a watch, a tablet computer, a notebook computer, and/or any other known or later developed mobile device or personal computer. The mobile device 122 may also be an automobile head unit, infotainment system, and/or any other known or later developed automotive navigation system. Non-limiting embodiments of navigation devices may also include relational database service devices, mobile phone devices, car navigation devices, and navigation devices used for air or water travel.

Figure 13:
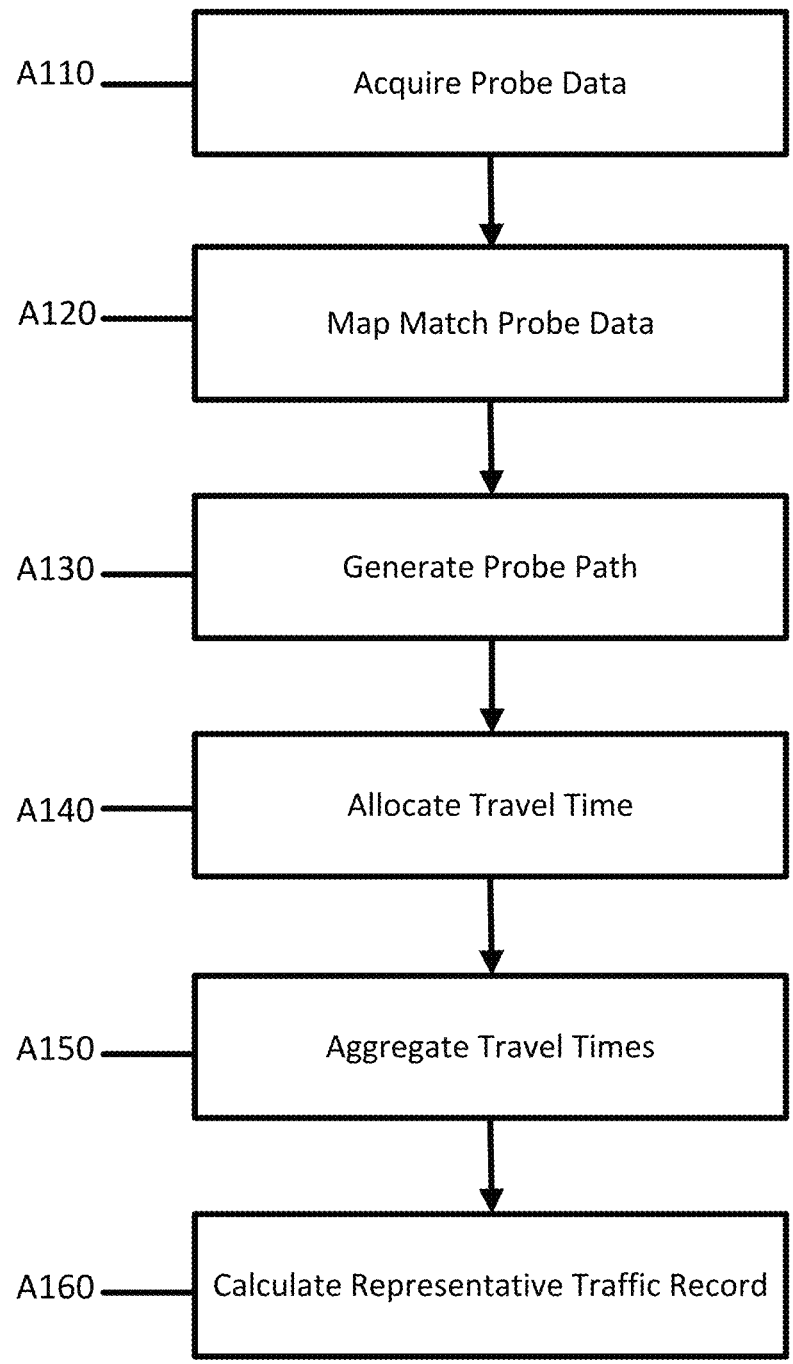
FIG. 13 depicts an example workflow for real-time lane-level traffic processing according to an embodiment.
Figure 14:
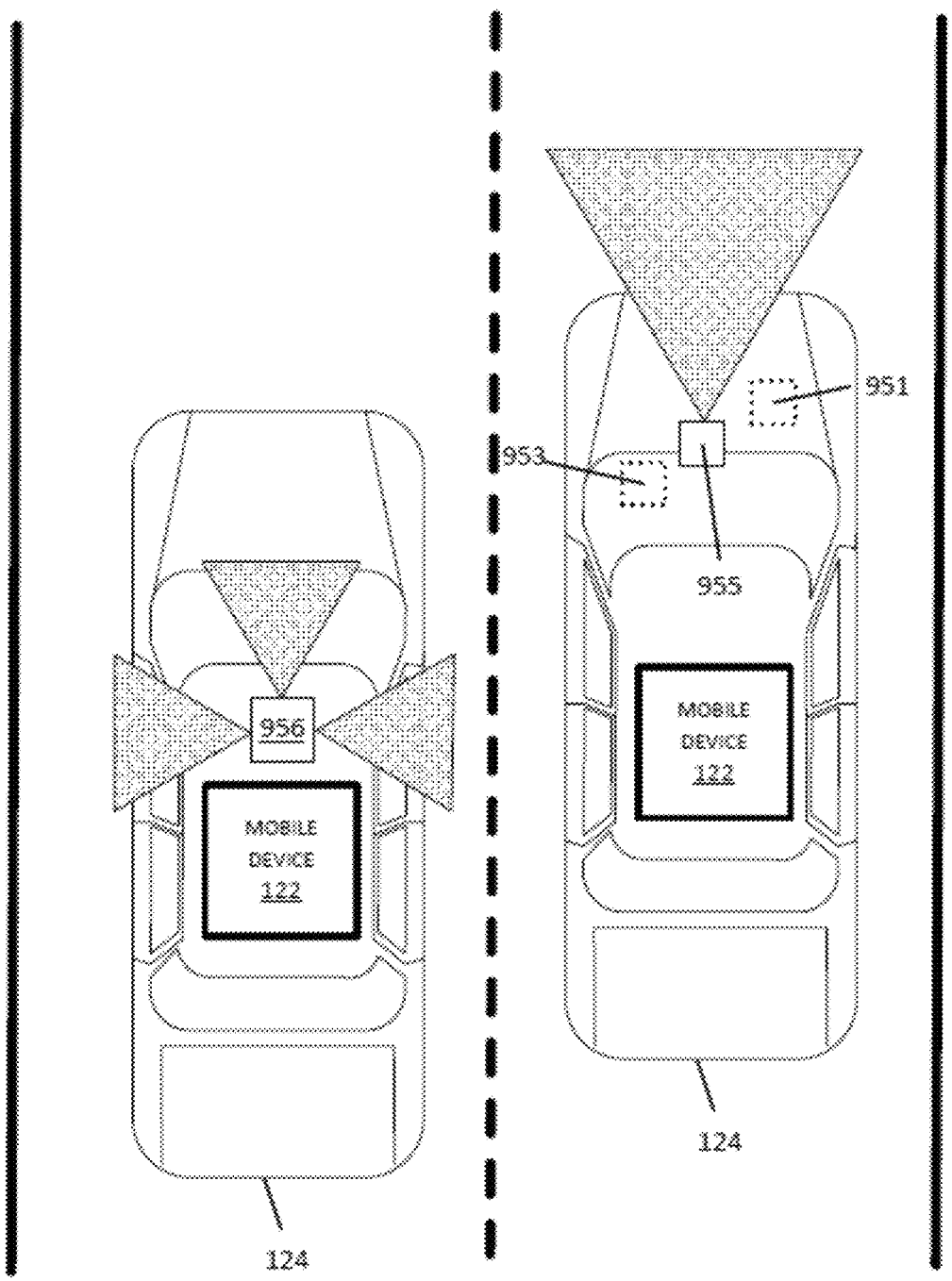
FIG. 14 depicts an example autonomous vehicle according to an embodiment.

FIG. 13 depicts an example workflow for real-time lane-level traffic processing using the server 125 of FIG. 11 and the device 122 of FIG. 12. As presented in the following sections, the acts may also in part be performed using any combination of the components indicated in FIG. 1, 11, or 12. For example, certain acts may be performed by the server 125, the device 122, the mapping system 121, or a combination thereof. Additional, different, or fewer acts may be provided. The acts are performed in the order shown or other orders. The acts may also be repeated. Certain acts may be skipped.

At Act A110, the server 125 acquires probe data for a probe vehicle/device 122. The device 122 is configured to determine its location using the position circuitry 922, ranging circuitry 923, vehicle circuitry 924, and the geographic database 123. The positioning circuitry 922 may include suitable sensing devices that measure the traveling distance, speed, direction, and so on, of the mobile device 122. The positioning system may also include a receiver and correlation chip to obtain a GPS signal. Alternatively, or additionally, the one or more detectors or sensors may include an accelerometer and/or a magnetic sensor built or embedded into or within the interior of the mobile device 122. The accelerometer is operable to detect, recognize, or measure the rate of change of translational and/or rotational movement of the mobile device 122. The magnetic sensor, or a compass, is configured to generate data indicative of a heading of the mobile device 122. Data from the accelerometer and the magnetic sensor may indicate orientation of the mobile device 122. The mobile device 122 receives location data from the positioning system. The location data indicates the location of the mobile device 122.

The positioning circuitry 922 may include a Global Positioning System (GPS), Global Navigation Satellite System (GLONASS), or a cellular or similar position sensor for providing location data. The positioning system may utilize GPS-type technology, a dead reckoning-type system, cellular location, or combinations of these or other systems. The positioning circuitry 922 may include suitable sensing devices that measure the traveling distance, speed, direction, and so on, of the mobile device 122. The positioning system may also include a receiver and correlation chip to obtain a GPS signal. The mobile device 122 receives location data from the positioning system. The location data indicates the location of the mobile device 122.

The position circuitry 922 may also include gyroscopes, accelerometers, magnetometers, or any other device for tracking or determining movement of a mobile device 122. The gyroscope is operable to detect, recognize, or measure the current orientation, or changes in orientation, of a mobile device 122. Gyroscope orientation change detection may operate as a measure of yaw, pitch, or roll of the mobile device 122.

The device 122 may also be configured to acquire the data for the location using one or more sensors and/or the geographic database 123. The one or more sensors may include ranging circuitry 923, image/video cameras, weather sensors, occupant sensors, and any other vehicle sensor that collects data about the vehicle or the environment around the vehicle. For example, the ranging circuitry 923 may include a LIDAR system, a RADAR system, a structured light camera system, SONAR, or any device configured to detect the range or distance to objects from the mobile device 122. The controller 900 of the device 122 may also communicate with a vehicle engine control unit (ECU) that operates one or more driving mechanisms (e.g., accelerator, brakes, steering device). Alternatively, the mobile device 122 may be the vehicle ECU that operates the one or more driving mechanisms directly.

The device 122 may communicate with the server 125 to provide the probe data. The communication interface 918 and/or communication interface 918 may include any operable connection. An operable connection may be one in which signals, physical communications, and/or logical communications may be sent and/or received. An operable connection may include a physical interface, an electrical interface, and/or a data interface. The communication interface 918 provides for wireless and/or wired communications in any now known or later developed format. The radio 909 may be configured to radio frequency communication (e.g., generate, transit, and receive radio signals) for any of the wireless networks described herein including cellular networks, the family of protocols known as WIFI or IEEE 802.11, the family of protocols known as Bluetooth, or another protocol.

At Act A120, the server 125 map matches each of the probe data at a lane level. The probe data includes latitude and longitude of the probe as it traversed a geographical region. A lane level map matcher may select/match a road segment or link by identifying the segment closest to the latitude and longitude of the probe data point. The lane level map matcher may be provided by the server 125 or the device 122. The lane level map matcher determines a lane strand/lane location based on or more techniques. In one embodiment, the server 125 uses a lane level map matcher to map match at least one trajectory (e.g., corresponding to a vehicle) to a lane-level of the road segment. The trajectory may be map-matched to the respective map or geographic records (e.g., stored in the geographic database 123) via position or GPS data associations (such as using known or future map matching or geo-coding techniques) and more specifically, the trajectory may be map-matched to individual lanes (e.g., any of the travel lanes, shoulder lanes, restricted lanes, service lanes, etc.) of the roadways by matching the geographic coordinates (e.g., longitude and latitude) between the probe data, sensor data, or a combination thereof and the respective lanes of the road segment.

In one embodiment, because the location measurement error in the probe data, sensor data, or a combination thereof (e.g., GPS error) can be greater than a lane width (making lane level map matching a technical challenge), the server 125/map matcher may use a probabilistic approach or other equivalent approach to perform lane level map matching. For example, under a probabilistic approach, the server 125 uses the raw GPS probe positions (e.g., links+latitude (lat) and longitude (lon)) for each probe to create a layer of abstraction over a digital map. The server 125 uses the abstraction layer (<Link-ID>, <d-value>) to generate lane probabilities of probes based on their lateral position (lane distance (d-value)) within a road segment. In one embodiment, the generated lane probabilities form the emission probabilities of a statistical model (e.g., a Hidden Markov Model (HMM)) that the server 125 may use to make an inference of the actual most probable lane(s) a probe trajectory traversed (e.g., one or more lanes of a multi-lane road). In one instance, the server 125 may use a dynamic programming algorithm (e.g., the Viterbi algorithm) to make this inference.

At Act A130, the server 125 generates a probe path for the probe vehicle. The trajectory or probe path may include a list of each link and/or lane that the probe vehicle traversed. At Act A140, the server 125 allocates a travel-time per-link for the probe trajectory to one or more lanes. The server 125 allocates lane level travel time to every link in the probe path. The server 125 duplicates the probe path if needed based on the following logic. The algorithm is based on the delta between the last and the first probe map matched lane in the probe path. if |Δ(P2L−P1L)|=0 then 1 probe path (i.e., probe stayed on same lane) else if |Δ(P2L−P1L)|=1 then duplicate probe path across both lanes. (i.e., create two probe-path speed for both lanes) else if |Δ(P2L−P1L)|>1 then filter out the probe path (i.e., drop the probe-path).

At Act A150, the server 125 aggregates probe trajectories and probe-path speeds per-lane. At Act A160, the server 125 calculates a representative traffic record/speed for the one or more lanes. The server 125 may calculate the representative speed at regular intervals, for example, every 10 seconds, 30 seconds, or 1 minute, thus providing up to date/real-time traffic processing for respective lanes. The server 125 collects all the travel times on a specific lane and periodically (every epoch) produces a traffic record for the lane. The traffic record may be the speed of all the vehicles that traversed the lane in the current epoch. The representative speed and/or traffic record may be published or otherwise provided to the one or more devices 122. The traffic record for a respective lane may be used for navigation services, smart city analytics, incident management, DOT planning, autonomous driving, and/or dispatch of safety services from first responders among other uses. The differences of speeds across lanes may also help identify that some repair service is needed while the overall road condition remains passable.

In an example, a navigation device 122 may access the traffic record and perform one or more maneuvers or generate an alert in response. The alert may be used to be aware of representative speeds. The alert may be, for example a routing instruction to take a different route. The routing instructions may be provided by display 914. The mobile device 122 may be configured to execute routing algorithms to determine an optimum route to travel along a road network from an origin location to a destination location in a geographic region. Using input(s) including map matching values from the server 125, a mobile device 122 examines potential routes between the origin location and the destination location to determine the optimum route. The mobile device 122, which may be referred to as a navigation device, may then provide the end user with information about the optimum route in the form of guidance that identifies the maneuvers required to be taken by the end user to travel from the origin to the destination location. Some mobile devices 122 show detailed maps on displays outlining the route, the types of maneuvers to be taken at various locations along the route, locations of certain types of features, and so on. Possible routes may be calculated based on a Dijkstra method, an A* algorithm or search, and/or other route exploration or calculation algorithms that may be modified to take into consideration assigned cost values of the underlying road segments.

In response to the alert, a vehicle or driver may decide to take a different route. The controller 900 may also include a routing module including an application specific module or processor that calculates routing between an origin and destination. The routing module is an example means for generating a route. The display 914 is an example means for displaying the routing command. The mobile device 122 may generate a routing instruction based on the anonymized data. The routing instructions may be provided by the display 914. The mobile device 122 may be configured to execute routing algorithms to determine an optimum route to travel along a road network from an origin location to a destination location in a geographic region. Using input(s) including map matching values from the mapping system 121, a mobile device 122 examines potential routes between the origin location and the destination location to determine the optimum route. The mobile device 122, which may be referred to as a navigation device, may then provide the end user with information about the optimum route in the form of guidance that identifies the maneuvers required to be taken by the end user to travel from the origin to the destination location. Some mobile devices 122 show detailed maps on displays outlining the route, the types of maneuvers to be taken at various locations along the route, locations of certain types of features, and so on.

A user may interact with the map/navigation system/alert using an input device 916. The input device 916 may be one or more buttons, keypad, keyboard, mouse, stylus pen, trackball, rocker switch, touch pad, voice recognition circuit, or other device or component for inputting data to the mobile device 122. The input device 916 and display 914 may be combined as a touch screen, which may be capacitive or resistive. The display 914 may be a liquid crystal display (LCD) panel, light emitting diode (LED) screen, thin film transistor screen, or another type of display. The output interface of the display 914 may also include audio capabilities, or speakers. In an embodiment, the input device 916 may involve a device having velocity detecting abilities.

In an embodiment, the device 122 may alert or otherwise provide instructions for an autonomous vehicle to perform a maneuver. FIG. 12 illustrates an exemplary vehicle 124 for providing location-based services, navigation services, or applications using the systems and methods described herein as well as collecting data for such services or applications described herein. The vehicles 124 may include a variety of devices that collect position data as well as other related sensor data for the surroundings of the vehicle 124. The position data may be generated by a global positioning system, a dead reckoning-type system, cellular location system, or combinations of these or other systems, which may be referred to as position circuitry or a position detector. The positioning circuitry may include suitable sensing devices that measure the traveling distance, speed, direction, and so on, of the vehicle 124. The positioning system may also include a receiver and correlation chip to obtain a GPS or GNSS signal. Alternatively, or additionally, the one or more detectors or sensors may include an accelerometer built or embedded into or within the interior of the vehicle 124. The vehicle 124 may include one or more distance data detection device or sensor, such as a LIDAR device. The distance data detection sensor may include a laser range finder that rotates a minor directing a laser to the surroundings or vicinity of the collection vehicle on a roadway or another collection device on any type of pathway.

A connected vehicle includes a communication device and an environment sensor array for reporting the surroundings of the vehicle 124 to the server 125. The connected vehicle may include an integrated communication device coupled with an in-dash navigation system. The connected vehicle may include an ad-hoc communication device such as a mobile device 122 or smartphone in communication with a vehicle system. The communication device connects the vehicle to a network including at least one other vehicle and at least one server 125. The network may be the Internet or connected to the internet.

The sensor array may include one or more sensors configured to detect surroundings of the vehicle 124. The sensor array may include multiple sensors. Example sensors include an optical distance system such as LiDAR 956, an image capture system 955 such as a camera, a sound distance system such as sound navigation and ranging (SONAR), a radio distancing system such as radio detection and ranging (RADAR) or another sensor. The camera may be a visible spectrum camera, an infrared camera, an ultraviolet camera, or another camera.

In some alternatives, additional sensors may be included in the vehicle 124. An engine sensor 951 may include a throttle sensor that measures a position of a throttle of the engine or a position of an accelerator pedal, a brake senor that measures a position of a braking mechanism or a brake pedal, or a speed sensor that measures a speed of the engine or a speed of the vehicle wheels. Another additional example, vehicle sensor 953, may include a steering wheel angle sensor, a speedometer sensor, or a tachometer sensor.

A mobile device 122 may be integrated in the vehicle 124, which may include assisted driving vehicles such as autonomous vehicles, highly assisted driving (HAD), and advanced driving assistance systems (ADAS). Any of these assisted driving systems may be incorporated into mobile device 122. Alternatively, an assisted driving device may be included in the vehicle 124. The assisted driving device may include memory, a processor, and systems to communicate with the mobile device 122. The assisted driving vehicles may respond to the lane marking indicators (lane marking type, lane marking intensity, lane marking color, lane marking offset, lane marking width, or other characteristics) received from geographic database 123 and the server 125 and driving commands or navigation commands.

The term autonomous vehicle may refer to a self-driving or driverless mode in which no passengers are required to be on board to operate the vehicle. An autonomous vehicle may be referred to as a robot vehicle or an automated vehicle. The autonomous vehicle may include passengers, but no driver is necessary. These autonomous vehicles may park themselves or move cargo between locations without a human operator. Autonomous vehicles may include multiple modes and transition between the modes. The autonomous vehicle may steer, brake, or accelerate the vehicle based on the position of the vehicle in order, and may respond to lane marking indicators (lane marking type, lane marking intensity, lane marking color, lane marking offset, lane marking width, or other characteristics) received from geographic database 123 and the server 125 and driving commands or navigation commands.

A highly assisted driving (HAD) vehicle may refer to a vehicle that does not completely replace the human operator. Instead, in a highly assisted driving mode, the vehicle may perform some driving functions and the human operator may perform some driving functions. Vehicles may also be driven in a manual mode in which the human operator exercises a degree of control over the movement of the vehicle. The vehicles may also include a completely driverless mode. Other levels of automation are possible. The HAD vehicle may control the vehicle through steering or braking in response to the on the position of the vehicle and may respond to lane marking indicators (lane marking type, lane marking intensity, lane marking color, lane marking offset, lane marking width, or other characteristics) received from geographic database 123 and the server 125 and driving commands or navigation commands.

Similarly, ADAS vehicles include one or more partially automated systems in which the vehicle alerts the driver. The features are designed to avoid collisions automatically. Features may include adaptive cruise control, automate braking, or steering adjustments to keep the driver in the correct lane. ADAS vehicles may issue warnings for the driver based on the position of the vehicle or based on the lane marking indicators (lane marking type, lane marking intensity, lane marking color, lane marking offset, lane marking width, or other characteristics) received from geographic database 123 and the server 125 and driving commands or navigation commands.

The term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, embodiment, the computer-readable medium may include a solid-state memory such as a memory card or other package that houses one or more non-volatile read-only memories. Further, the computer-readable medium may be a random-access memory or other volatile re-writable memory. Additionally, the computer-readable medium may include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations may include distributed processing, component/object distributed processing, and parallel processing. Alternatively, virtual computer system processing may be constructed to implement one or more of the methods or functionalities as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) may be written in any form of programming language, including compiled or interpreted languages, and it may be deployed in any form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in the specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

As used in the application, the term 'circuitry' or 'circuit' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Processors suitable for the execution of a computer program include, by way of example, both general and special purpose microprocessors, and anyone or more processors of any kind of digital computer. Generally, a processor receives instructions and data from a read only memory or a random-access memory or both. The essential elements of a computer are a processor for performing instructions and one or more memory devices for storing instructions and data. Generally, a computer also includes, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a GPS receiver, to name just a few. Computer readable media suitable for storing computer program instructions and data include all forms of non-volatile memory, media, and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The memory may be a non-transitory medium such as a ROM, RAM, flash memory, etc. The processor and the memory may be supplemented by, or incorporated in, special purpose logic circuitry.

To provide for interaction with a user, embodiments of the subject matter described in this specification may be implemented on a device having a display, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Embodiments of the subject matter described in this specification may be implemented in a computing system that includes a back end component, e.g., as a data server, or that includes a middleware component, e.g., an application server, or that includes a front end component, e.g., a client computer having a graphical user interface or a Web browser through which a user may interact with an implementation of the subject matter described in this specification, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments may also be implemented in combination in a single embodiment. Conversely, various features that are described in the context of a single embodiment may also be implemented in multiple embodiments separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

The invention claimed is:

1. A method for real-time lane level traffic processing, the method comprising:
    acquiring probe data from a probe vehicle, the probe data comprising at least latitude and longitude of the probe vehicle acquired using position circuitry of the probe vehicle;
    map matching the probe data at a lane level;
    generating a probe path for the probe vehicle based on the map matched probe data;
    allocating a travel-time per link for the probe path to one or more lanes on each respective link, wherein an entire travel time is allocated to a lane if the probe vehicle stayed on the lane, duplicate a probe path across two lanes if the probe path of the probe vehicle traversed two lanes between two probe points, and filter out the probe path if the probe vehicle traversed two lanes between two probe points;
    aggregating probe paths and probe speeds for each lane of the one or more lanes; and
    calculating, in real time, a representative speed for each lane of the one or more lanes based on the aggregated probe trajectories and probe speeds.

2. The method of claim 1, further comprising:
    publishing the representative speed for each lane of the one or more lanes.

3. The method of claim 2, further comprising:
generating a route from an origin to a destination at the lane level; and
calculating an estimated time of arrival for the route based on at least the published representative speed.

4. The method of claim 1, wherein map matching comprises:
matching positional coordinates for respective probe data against lane-based probabilities for historical probe data.

5. The method of claim 1, wherein calculating the representative speed comprises weighting newer probe data and speeds more than older probe data and speeds.

6. The method of claim 1, wherein calculating comprises calculating at regular intervals the representative speeds for each interval.

7. A system for real-time lane-level traffic processing, the system comprising:
a probe relay configured to receive probe data from a probe vehicle;
a path analyzer configured to generate probe paths from the probe data;
a lane level map matcher configured to map match each of the probe data to a lane;
a lane level travel time allocator configured to allocate lane level travel time to every lane in a respective probe path of the probe paths, wherein the lane level travel time allocator is configured to allocate an entire travel time to a lane if the probe vehicle stayed on the lane, duplicate a probe path across two lanes if a probe path of the probe vehicle traversed two lanes between two probe points, and filter out a probe path if the probe vehicle traversed two lanes between two probe points;
a lane aggregator configured to collect all the lane level travel times on a specific lane and produce in real time a traffic record for the specific lane; and
a publisher configured to publish the traffic record.

8. The system of claim 7, further comprising:
a routing module configured to generate or adjust a route based on the published traffic record.

9. The system of claim 7, wherein each probe point of the probe data includes at least longitude and latitude values.

10. The system of claim 7, wherein the lane level map matcher is configured to map match each of the probe data to the lane by matching positional coordinates for the probe data against lane-based probabilities for historical probe data.

11. The system of claim 7, wherein the traffic record comprises an average speed for the specific lane.

12. An apparatus comprising:
at least one processor; and
at least one memory including computer program code for one or more programs; the at least one memory configured to store the computer program code configured to, with the at least one processor, cause the at least one processor to:
acquire probe data from a probe vehicle;
map match the probe data at a lane level;
generate a probe path for the probe vehicle based on the map matched probe data;
allocate a travel-time per link for the probe path to one or more lanes on each respective link, wherein an entire travel time is allocated to a lane if the probe vehicle stayed on the lane, a probe path across two lanes is duplicated if a probe path of the probe vehicle traversed two lanes between two probe points, and a probe path is filtering out if the probe vehicle traversed two lanes between two probe points;
aggregate probe paths and probe speeds for each lane of the one or more lanes; and
calculate, at regular intervals, a representative speed for each lane of the one or more lanes based on the aggregated probe trajectories and probe speeds.

13. The apparatus of claim 12, wherein the computer program code is further configured to, with the at least one processor, cause the at least one processor to:
publish the representative speed for each lane of the one or more lanes.

14. The apparatus of claim 13, wherein the computer program code is further configured to, with the at least one processor, cause the at least one processor to:
generate a route from an origin to a destination at the lane level; and
calculate an estimated time of arrival for the route based on at least the published representative speed.

15. The apparatus of claim 12, wherein each probe point of the probe data includes at least longitude and latitude values.

* * * * *